US 6,670,998 B2

(12) United States Patent
Wakabayashi

(10) Patent No.: US 6,670,998 B2
(45) Date of Patent: Dec. 30, 2003

(54) IMAGE DISPLAY DEVICE WITH CONTROLLED IMAGE QUALITY

(75) Inventor: Toshitsugu Wakabayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 29 days.

(21) Appl. No.: 10/117,235

(22) Filed: Apr. 8, 2002

(65) Prior Publication Data

US 2002/0109789 A1 Aug. 15, 2002

Related U.S. Application Data

(62) Division of application No. 09/251,328, filed on Feb. 17, 1999, now Pat. No. 6,400,418.

(30) Foreign Application Priority Data

Sep. 28, 1998 (JP) .......................................... P10-273016

(51) Int. Cl.[7] .................................................. H04N 5/14
(52) U.S. Cl. ...................................... 348/576; 348/601
(58) Field of Search ................................. 348/806, 576, 348/577, 564, 601, 177–180, 561, 566, 565; 345/625, 655, 656, 666, 681, 682, 724

(56) References Cited

U.S. PATENT DOCUMENTS

| 3,757,038 A | * | 9/1973 | Tannery et al. ................ 356/71 |
| 3,922,483 A | | 11/1975 | Indri |
| 4,366,451 A | | 12/1982 | Kowal |
| 4,528,585 A | * | 7/1985 | Bolger ........................ 358/22 |
| 4,679,067 A | * | 7/1987 | Belmares-Sarabia et al. . 358/29 |
| 4,751,507 A | * | 6/1988 | Hama et al. ................. 340/724 |
| 4,782,384 A | * | 11/1988 | Tucker et al. ................. 358/22 |
| 5,351,091 A | | 9/1994 | Hosoya et al. |

FOREIGN PATENT DOCUMENTS

| JP | 5068221 | 6/1975 |
| JP | 2312465 | 12/1990 |
| JP | 5268491 | 10/1993 |
| JP | 6189161 | 7/1994 |
| JP | 0993501 | 9/1995 |
| JP | 9247461 | 9/1997 |

* cited by examiner

Primary Examiner—Victor R. Kosiak
(74) Attorney, Agent, or Firm—Birch, Stewart, Kolasch & Birch, LLP

(57) ABSTRACT

An image display device has an image output unit for displaying an overall image represented by an image signal, a region designation unit for designating a particular region within the overall image, the region designation unit including a position signal extraction unit for extracting a position signal from a predetermined signal on which the position signal is superimposed and received by the image display device, and a region decision unit for deciding the particular region on a basis of the position signal, and a control unit for selectively controlling an image quality of an image for the particular region.

11 Claims, 20 Drawing Sheets

IMAGE DISPLAY DEVICE WITH CONTROLLED IMAGE QUALITY

This application is a divisional of application Ser. No. 09/251,328, filed on Feb. 17, 1999 now U.S. Pat. No. 6,400,418 the entire contents of which are hereby incorporated by reference and for which priority is claimed under 35 U.S.C. §120; and this application claims priority of Application No. 10-273016 filed in Japan on Sep. 28, 1998 under 35 U.S.C. §119.

BACKGROUND OF THE INVENTION

1. Field of the Invention

The present invention relates to an image display device represented by a CRT (Cathode-Ray Tube) display device; particularly, relates to improving the visual quality of displayed image.

2. Description of the Background Art

FIG. 25 is a block diagram showing an internal structure of a conventional image display device as a background of the present invention. This device 150 is formed as a CRT device having a CRT 91. An image signal Pin inputted from the exterior is amplified by an amplifier 92 into an image signal Pc. The image signal Pc is supplied to the cathode (not shown) of the CRT 91. The input of the amplifier 92 is connected to a parallel circuit of a resistor 93 and a series circuit. The series circuit includes a capacitor 94 and a resistor 95 connected in series to each other. The input and the output of the amplifier 92 are connected to each other through a resistor 96. Thus, the device 150 comprises an active type (a current feedback type) of a video amplifying circuit.

A series circuit having an inductor 97 and a resistor 98 connected in series to each other is interposed into a path between the output of the amplifier 92 and the cathode of the CRT 91. The gain of the video amplifying circuit including the amplifier 92 is defined by resistance of the resistors 93, 95, 96 and 98, capacitance of the capacitor 94, and an inductance of the inductor 97. In particular, the capacitor 94 and the inductor 97 can compensate a high frequency component of the gain. That is, the capacitance of the capacitor 94 and the inductance of the inductor 97 define a frequency characteristic of the gain.

The CRT 91 is further connected to a high voltage generation unit 99. The high voltage generation unit 99 supplies the CRT 91 with high voltage so as to implement an injection of electron beam inside the CRT 91. As the conventional device 150 is so formed as described above, an image represented by the image signal Pin is displayed on a screen provided at a front portion of the CRT 91.

In the conventional device 150, however, the frequency characteristic of the gain for the image signal Pc is fixed. That is, the frequency characteristic disadvantageously can not be freely varied depending on a type of the image or the like. Another type of the conventional device 150 is known in which the resistor 95 is replaced with a pre-set variable resistor. In this type, the resistance of the pre-set variable resistor, however, can not be varied with electric means. Therefore, it is disadvantageously hard to adjust the frequency characteristic in order to optimize the visual image quality depending on the type of the image.

Further, a technique is not known which allows control of the frequency characteristic and the like exclusively for a particular region within entire one frame image where the particular type of the image is laid out so that the image quality in the region is suited to the type of the image. Thus, the conventional device is disadvantageous in that it is hard to obtain the optimum image quality depending on the type of the image.

The following documents are known in relation to the control of the frequency characteristic of the video amplifying circuit: Japanese Patent Laid Open Gazette No. 50-68221, No. 2-312465, and No. 6-189161.

SUMMARY OF THE INVENTION

A first aspect of the present invention is directed to an image display device. The image display device comprises: an image output unit for displaying an image represented by an image signal; an amplifying unit for amplifying the image signal with a gain having a frequency characteristic and supplying the amplified image signal to the image output unit, including a variable inductor, an inductance of which defines the frequency characteristics; and a control unit for controlling the inductance of the variable inductor.

According to a second aspect of the present invention, in the image display device of the first aspect, the amplifying unit further comprises an amplifier for amplifying the image signal, and the variable inductor is interposed into a path between the amplifier and the image output unit.

According to a third aspect of the present invention, in the image display device of the first or the second aspect, the variable inductor includes primary and secondary windings inductively coupled with each other, the primary winding is connected to the amplifier, the secondary winding is connected to the control unit, the inductance of the variable inductor is an inductance of the primary winding, and the control unit controls a current which is induced in the secondary winding by a current flowing in the primary winding.

According to a fourth aspect of the present invention, in the image display device of any one of the first to the third aspects, the image display device receives a synchronizing signal of the image, and further comprises a resolution detection unit for detecting a resolution of the image signal on a basis of the synchronizing signal, and the control unit varies the frequency characteristic depending on the resolution.

According to a fifth aspect of the present invention, in the image display device of any one of the first to the fourth aspects, the image display device further comprises a transient characteristic detection unit for detecting a pulse waveform of the image signal outputted from the amplifying unit, and the control unit controls the frequency characteristic so that the pulse waveform detected by the transient characteristic detection unit approaches a target form.

According to a sixth aspect of the present invention, in the image display device of any one of the first to the fifth aspects, the image display device further comprises a brightness detection unit for detecting a brightness of the image displayed by the image output unit, and the control unit judges the display image on a basis of the brightness as a binary image of normal display or a binary image of reverse display and controls the frequency characteristic as to enhance a higher frequency component of the gain for the binary image of normal display and to reduce the higher frequency component for the binary image of reverse display.

A seventh aspect of the present invention is directed to an image display device. The image display device comprises: an image output unit for displaying an overall image represented by an image signal; a region designation unit <8> for designating a particular region <W> within the overall image; and a control unit <4> for selectively controlling an image quality of an image for the particular region.

According to an eighth aspect of the present invention, in the image display device of the seventh aspect, the image display device receives a synchronizing signal on which a position signal is superimposed and the region designation unit comprises: a position signal extraction unit for extracting the position signal from the synchronizing signal, and a region decision unit for deciding the particular region on a basis of the position signal.

According to a ninth aspect of the present invention, in the image display device of the seventh aspect, the image display device receives the image signal together with a position signal which is superimposed on the image signal, and the region designation unit comprises: a position signal extraction unit for extracting the position signal superimposed from the image signal, and a region decision unit for deciding the particular region on a basis of the position signal.

According to a tenth aspect of the present invention, in the image display device of the eighth or the ninth aspect, the position signal represents a type of the image quality to be controlled, the region designation unit further comprises an image quality control decoding unit for decoding the position signal into the type of the image quality, and the control unit selectively controls the type of the image quality based on the image quality.

In the device of the first aspect, since the frequency characteristic of the gain of the amplifying unit is controlled by controlling the inductance of the variable inductor, the frequency characteristic can be easily and electrically adjusted so as to be suited for the image signal and thereby a visually desirable image quality can be obtained.

In the device of the second aspect, since a variable inductor is interposed into a path between the amplifier and the image output unit, the amplifying unit is obtained by replacing an inductor provided in a conventional device with the variable inductor. Therefore, design and manufacturing sources such as design data in the conventional device can be used as they are, which reduces design and manufacturing cost.

In the device of the third aspect, the variable inductor includes primary and secondary windings inductively coupled with each other, and the inductance of the primary winding is controlled by controlling the current flowing in the secondary winding. Hence, the electrical control of the frequency characteristic can be further easily performed.

In the device of the fourth aspect, since the frequency characteristic is so controlled as to change depending on the resolution of the image signal, the frequency characteristic visually suitable for the resolution of the image signal can be obtained automatically.

In the device of the fifth aspect, the frequency characteristic is so controlled that the pulse waveform of the image signal supplied to the image output unit approaches a target form. Therefore, visually proper frequency characteristic is automatically obtained irrespective of the pulse waveform of the inputted image signal.

In the device of the sixth aspect, the frequency characteristic is properly changed according to the display type i.e. the normal or reverse display of the image displayed by the image output unit when the image is a binary image. Therefore, the image having visually desirable image quality can be automatically displayed even if the display type changes.

In the device of the seventh aspect, the image quality is selectively controlled for a particular region designated within the overall image. Therefore, it is possible to control the image quality e.g. frequency characteristic or brightness selectively for a particular image among plural images included in the overall image so that the image quality is suited to the type of the image.

In the device of the eighth aspect, the particular region is decided on the basis of the position signal superimposed on the synchronizing signal inputted together with the image signal from the exterior. Therefore, the region can be designated by an external device which supplies the image signal to the image display device.

In the device of the ninth aspect, the particular region is decided on the basis of the position signal superimposed on the image signal inputted from the exterior. Therefore, the particular region can be designated by an external device which supplies the image signal to the image display device. Moreover, the position signal is displayed on a screen of the image output unit because of being superimposed on the image signal. Hence, it is easy to recognize the particular region visually.

In the device of the tenth aspect, the type of the image quality to be controlled e.g. the frequency characteristic or the brightness is decided on the basis of the position signal. Therefore, an external device can designate the type of image quality control to be performed for the particular region. Accordingly, it is possible to control the image quality flexibly so as to obtain visually desirable image quality for various types of images to be displayed.

Accordingly, it is an object of the present invention to obtain an image display device capable of optimizing visual quality of the image displayed on a screen depending on the type of the image.

These and other objects, features, aspects and advantages of the present invention will become more apparent from the following detailed description of the present invention when taken in conjunction with the accompanying drawings.

DESCRIPTION OF THE PREFERRED EMBODIMENTS

<1. First Preferred Embodiment>

First, an image display device of a first preferred embodiment of the present invention will be described.

<1-1. Structure and Outline of Operation>

Figure 1:
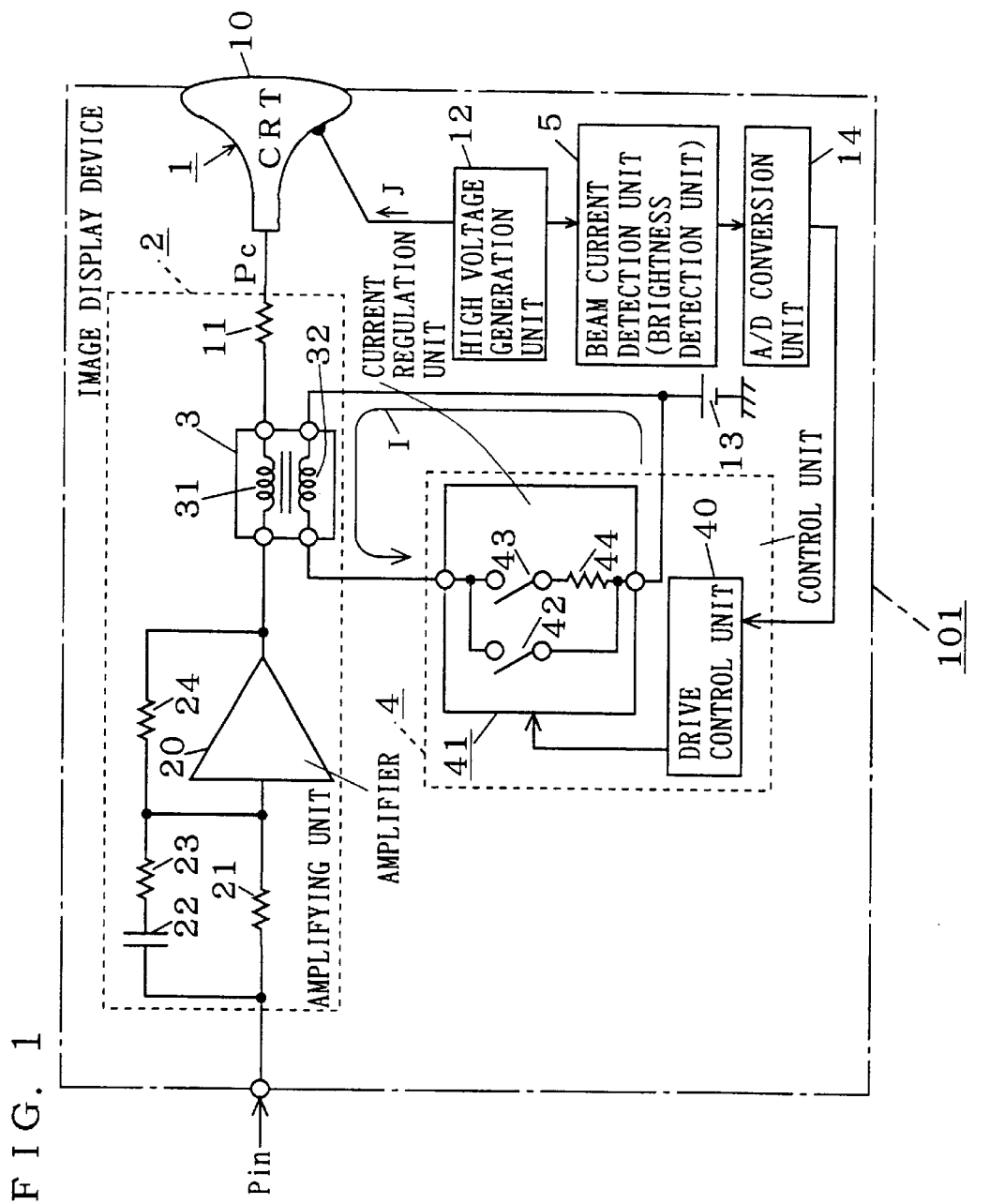
FIG. 1 is a block diagram showing a device of a first preferred embodiment of the present invention.

FIG. 1 is a block diagram showing a structure of the image display device of the first preferred embodiment. This device 101 comprises a CRT 1 as an image output unit. An image represented by an image signal Pin inputted from an exterior is displayed on a screen 10. The screen 10 is provided at a front portion of the CRT 1. Thus, the device 101 is formed as a CRT device.

The CRT 1 is further provided with a cathode (not shown). The cathode is connected to an amplifying unit 2. The amplifying unit 2 amplifies the image signal Pin, which is a voltage signal, into an image signal Pc. The image signal Pc is outputted from the amplifying unit 2 and is inputted to the cathode as a voltage signal. The amplifying unit 2 is formed as an active type (a current feedback type) of a video amplifying circuit. More specifically, an amplifier 20 is provided in the amplifying unit 2, the input of which is connected to a parallel circuit of a resistor 21 and a series circuit. The series circuit includes a capacitor 22 and a resistor 23 connected in series to each other. The input and the output of the amplifier 20 are connected to each other through a resistor 24.

A series circuit having an inductor 3 and an output resistor 11 connected in series to each other is interposed into a path between the output of the amplifier 20 and the cathode of the CRT 1. The gain of the amplifying unit 2 is defined by resistance of the resistors 21, 23, 24 and 11, capacitance of the capacitor 22, and an inductance of the inductor 3. In particular, the capacitor 22 and the inductor 3 can compensate a high frequency component of the gain. That is, the capacitance of the capacitor 22 and the inductance of the inductor 3 define a frequency characteristic of the gain. Especially, the inductance of the inductor 3 is variable i.e. the inductor 3 is a variable inductor so that the frequency characteristic of the gain is adjustable with the inductance.

The inductor 3 includes a primary winding 31 and a secondary winding 32 inductively coupling with each other. Preferably, the primary and secondary windings 31, 32 inductively couple through a magnetic substance. The primary winding 31 is interposed between the output of the amplifier 20 and the output resistor 11, while the secondary winding 32 is connected to a control unit 4. The control unit 4 controls a current I which is the secondary current induced in the secondary winding 32 by a current flowing in the primary winding 31. The control unit 4, thereby, controls the inductance of the primary inductor 31 i.e. an equivalent inductance of the inductor 3 in the amplifying unit 2. As a result, the frequency characteristic of the gain of the amplifying unit 2 is controlled. A known troidal common mode choking coil is preferably employed as the inductor 3, because the inductance of the primary winding can be widely changed by controlling the secondary current, and because of its low parasitic capacitance, excellent high frequency characteristic, high coupling coefficient and availability as a commercial product at low cost.

The control unit 4 comprises a current regulation unit 41 and a drive control unit 40. The current regulation unit 41 is connected to the secondary winding 32 and restricts the current I. The drive control unit 40 drives the current regulation unit 41. The current restriction characteristic of the current regulation unit 41 is variable. The drive control unit 40 changes the current restriction characteristic. More specifically, the current regulation unit 41 has two (generally plural) current paths connected to each other in parallel. These current paths respectively form two loops which share the secondary winding 32.

One of the two paths has a resistor 44 interposed thereinto so that the two paths are different from each other in the current restriction characteristic. The two paths respectively have switches 42 and 43 interposed thereinto. The switches 42 and 43 close (turn on) and open (turn off) in response to control signals transmitted from the drive control unit 40. For example, relays or semiconductor switching elements such as transistors are employed as the switches 42 and 43. When the transistors are utilized, the performances thereof are so selected and the control signals are so adjusted that the transistors operate within a saturation state during ON state.

The drive control unit 40, for example, closes (turns on) one of the switches 42 and 43 or opens (turns off) the both so as to implement three current restriction characteristics. When the transistors or the like are employed as the switches 42 and 43, a part of the path of the current I including the secondary winding 32 and the current regulation unit 41, e.g. one end of the secondary winding 32, is connected to a ground potential line or a constant potential line in order to adjust the relation between the potential of the control signals transmitted from the drive control unit 40 and the potential of the current regulation unit 41. In the latter case, a voltage source 13 is connected as FIG. 1 shows. The current regulation unit 41, thereby, can be formed of simple circuits.

A high voltage generation unit 12 is also connected to the CRT 1. The high voltage generation unit 12 supplies the CRT 1 with high voltage so as to implement an injection of electron beam inside the CRT 1. A beam current detection unit (a brightness detection unit) 5 is connected to the high voltage unit 12. The beam current detection unit 5 detects a beam current J i.e. the current of the electron beam by being connected to the high voltage unit 12. The detection signal of the beam current J is converted into a signal having digital form by an A/D conversion unit and thereafter transmitted to the drive control unit 40.

The drive control unit 40 preferably comprises a CPU (not shown) for operating according to a program and a memory (not shown) storing the program, although it can be formed only of hardware components operable without program. It, thereby, is possible to form the drive control unit 40 easily and simply. The drive control unit 40 controls the current regulation unit 41 on the basis of the beam current J.

The device 101 receives horizontal and vertical synchronizing signals, which are not shown in FIG. 1, from the exterior as well as the image signal Pin. The scanning of the electron beam in the CRT 1 is synchronized with the synchronizing signals so that the image represented by the image signal Pin is correctly displayed on the screen 10.

<1-2. Operation of Drive Control Unit>

FIGS. 2 to 5 are explanatory drawings illustrating an operation of the drive control unit 40 when the pulsed image signal Pin representing one pixel image is inputted. The pulsed image signal Pin, for example, represents a point or a line (e.g. a letter) in a binary image. As the amplifying unit 2 changes in its frequency characteristic defined by the inductor 3, the waveform of the image signal Pc inputted to the CRT 1 changes even if the waveform of the image signal Pin inputted from the exterior is the same.

Figure 2:
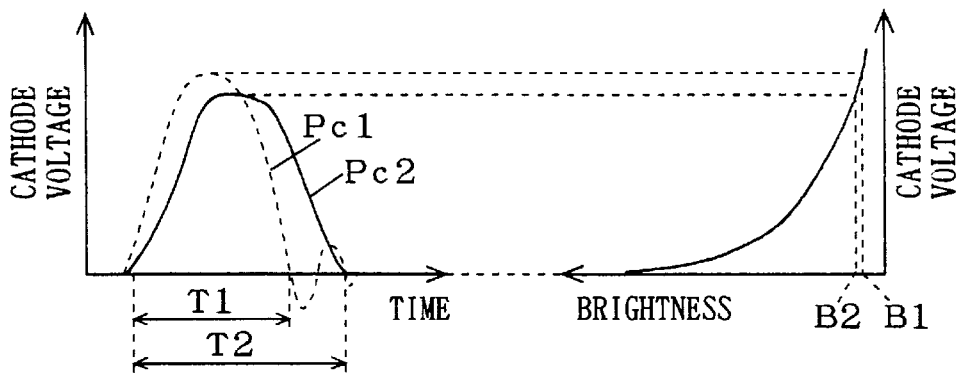
FIGS. 2 to 5 are explanatory drawings showing an operation of the device of the first preferred embodiment.

FIG. 2 illustrates two types of the image signals Pc and the brightness obtained by converting the same. The two types of the image signals Pc are obtained by passing the pulsed image signal Pin representing a dark letter or the like depicted on a bright background (i.e. a binary image of reverse display including a letter, a line, and so on) through the amplifying unit 2 having different frequency characteristics. An image signal Pc1 is one of the image signals Pc obtained under a frequency characteristic enhancing high frequency component. The image signal Pc1 is steep both at a leading edge and at a trailing edge, and has a high peak. Ringing also emerges after the image signal Pd returns to its initial value.

On the other hand, an image signal PC2 which is the other one of the image signals Pc obtained under a frequency characteristic reducing the high frequency component is gentle both at a leading edge and at a trailing edge, and has a low peak. Particularly, the image signal Pc2 takes long time to return to its initial value. Periods T1 and T2 from the leading edges to the return to the initial values (i.e. pulse widths) of the image signals Pc1 and Pc2 have a relation: T1<T2. The waveform of the image signal Pc is converted into the waveform of the brightness according to a gamma characteristic (i.e. a relation between cathode voltage and brightness) proper to the CRT 1.

Since the peak of image signal Pc1 is lower than the peak of the image signal Pc2, the brightnesses B1 and B2 of the image signals Pc1 and Pc2 have a relation: B1<B2. However, brightness difference represented by B2—B1 is not so clear as the difference between the peak heights of the image signals Pc1 and Pc2. This fact is well understood from the gamma characteristic curve shown in FIG. 2. Thus, in reverse display, the brightness does not show visually clear difference even if the high frequency component is different intensity.

Figure 3:
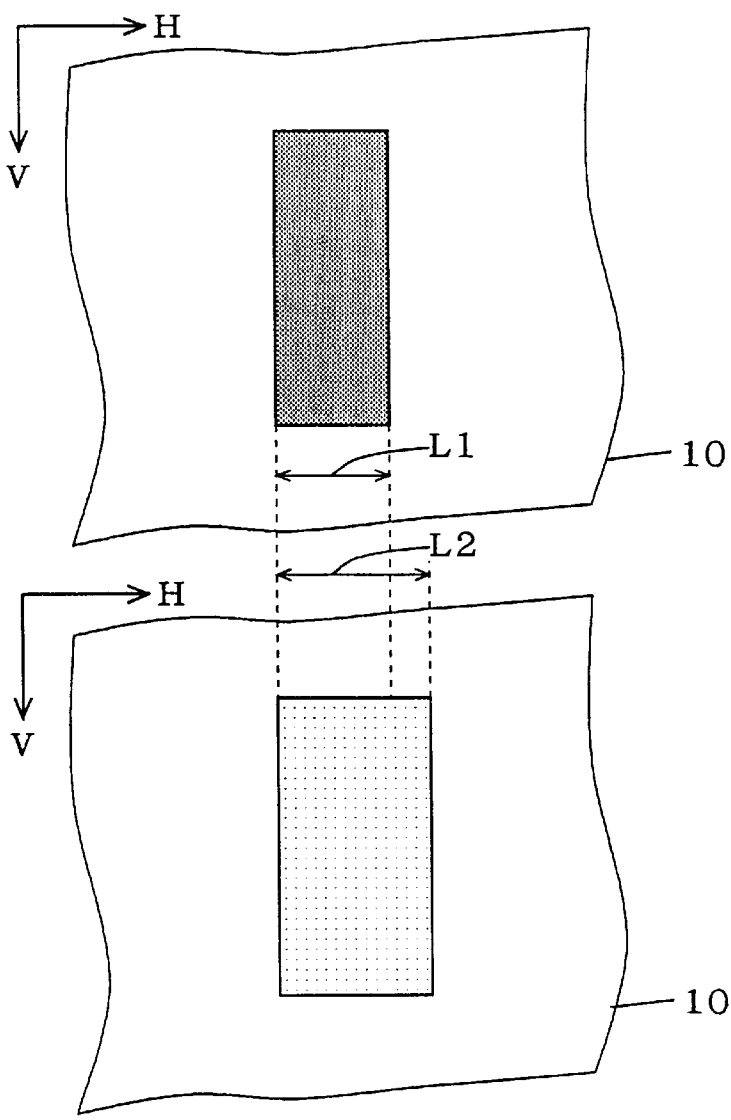

FIG. 3 illustrates image (e.g. letters) represented by the image signals Pc1 and Pc2. In an example shown in FIG. 3, each of the represented image is a linear segment lying along vertical direction V of the screen 10. Scanning lines of the electron beam lie along horizontal direction H. The pulsed image signal Pc1 or Pc2 shown in FIG. 2 emerges repeatedly at the same position along the horizontal direction H so that the image shown in FIG. 3 is displayed on the screen 10.

Widths L1 and L2 of the images respectively represented by the image signals Pc1 and Pc2 have a relation: L1<L2. This relation reflects the relation between the periods T1 and T2. The widths L1 and L2 correspond to a beam diameter under two frequency characteristics, respectively. The contrast of the dark letter against the bright background is somewhat higher in the image signal Pc1 than in the image signal Pc2 reflecting the relation between the brightnesses B1 and B2. The difference between the brightnesses, however, is not so large as visually recognized as mentioned above.

Figure 4:
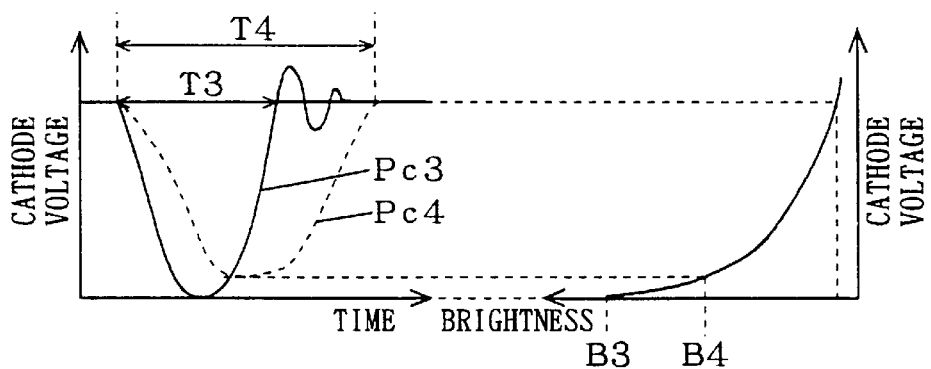

FIG. 4 illustrates two types of the image signals Pc3, Pc4 and the brightnesses B3, B4 obtained by converting the same. The image signals Pc3 and Pc4 are obtained by passing the pulsed image signal Pin representing a bright letter or the like depicted on a dark background (i.e. a binary image of normal display) through the amplifying unit 2 having difference frequency characteristics contrary to the case shown in FIG. 2. The image signal Pc3 obtained under a frequency characteristic enhancing high frequency component and is steep both at a leading edge and at a trailing edge, and has a deep inverse peak. Ringing also emerges after the image signal Pc3 returns to its initial value.

On the other hand, the image signal Pc4 obtained under a frequency characteristic reducing the high frequency component is gentle both at a leading edge and at a trailing edge, and has a shallow inverse peak. Furthermore, the image signal Pc4 takes long time to return to its initial value. Periods T3 and T4 from the leading edges to the return to the initial values of the image signals Pc3 and Pc4 have a relation: T3<T4, similarly to the relation in the reverse display.

The brightnesses B3 and B4 of the image signals Pc3 and Pc4 have a relation: B4<B3, contrary to the relation in the reverse display. Furthermore, a slight difference between the inverse peak depths of the image signals Pc3 and Pc4 brings large difference in brightness (B3–B4). Thus, in normal display, the brightness differs conspicuously even if the high frequency component differs slightly.

Figure 5:
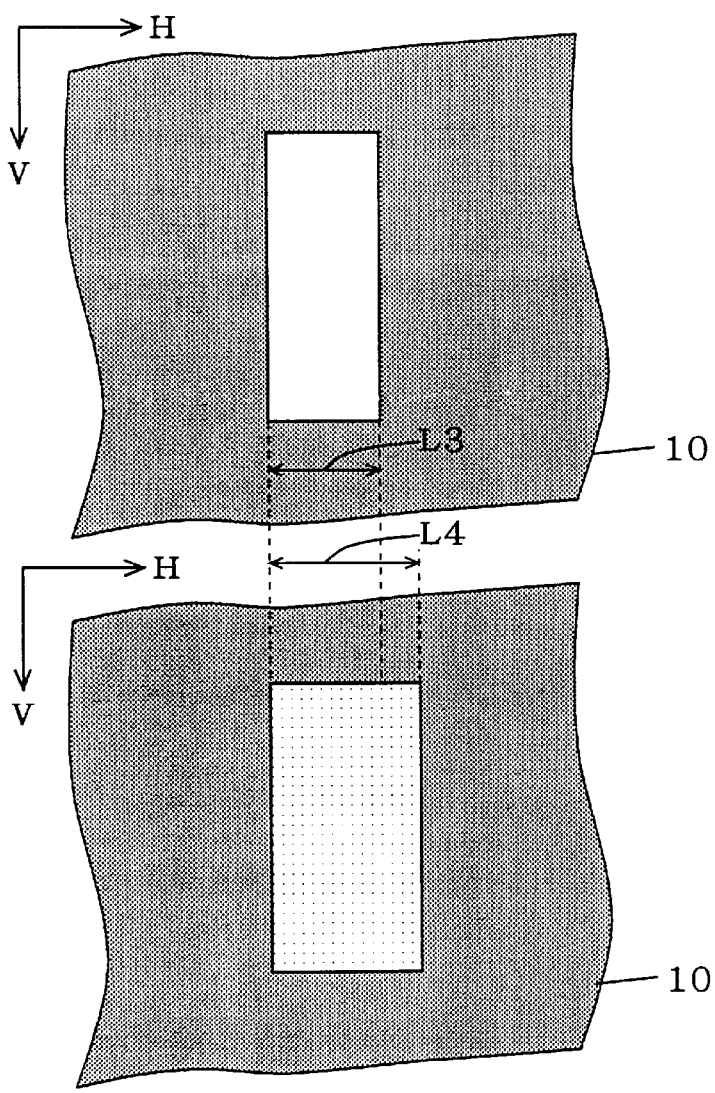

FIG. 5 illustrates images represented by the image signals Pc3 and Pc4. Each of the images illustrated in FIG. 5 is a linear segment lying along vertical direction V similar to that shown in FIG. 3. Widths L3 and L4 of the images respectively represented by the image signals Pc3 and Pc4 have a relation: L3<L4, similar to the relation in the reverse display. This relation reflects the relation between the periods T3 and T4. The contrast of the bright letter against the dark background is higher in the image signal Pc3 than in the image signal Pc4 reflecting the relation between the brightnesses B3 and B4. Besides, the difference between the brightnesses is visually clear.

In terms of visual image quality i.e. visual quality of image, a frequency characteristic where the high frequency component is enhanced is preferable for the reverse display, whereas a frequency characteristic where the high frequency component is suppressed is preferable for the normal display. The reason is as follows. In the reverse display, the contrast is not so different as visually recognized between the image signals Pc1 and Pc2. Besides, in the image signal Pc1, the electron beam is irradiated even at a portion on the screen 10 which does not need to emit light because of the small width L1, so that a portion of the letter which is properly dark is visually unclear. In the image signal Pc2, on the other hand, the electron beam is prevented from being irradiated at an unexpected portion because of the large width L2, so that the dark letter is visually clear.

The image signal Pc2 where the high frequency component is suppressed is preferable in the reverse display also from the viewpoint of preventing moire fringes (interference fringes) arising from interference between a grill pitch of an aperture grill (not shown) provided in the CRT 1 and the binary image. On the contrary, the moire fringes do not emerge and the contrast is higher in the image signal Pc3 than in the image signal Pc4 in the normal display. Accordingly, the image signal Pc3 where the high frequency component is enhanced is preferable in the normal display in terms of the visual image quality.

The drive control unit 40, therefore, suppresses the high frequency component of the gain of the amplifying unit 2 by turning off both the switches 42 and 43 for example when the image is the reverse one. The drive control unit 40, on the other hand, enhances the high frequency component by turning on the switch 43 for example when the image is the normal one.

It is also possible that the drive control unit 40 turns on the switch 42 to thereby further enhance the high frequency component when the image is not a binary image but an analogue image such as a moving picture and a photographic image. The enhancement of the high frequency component brings contour correction to the analogue image. The contour correction makes the contour of the analogue image visually clear. A relation between the enhancement of the high frequency component and the contour correction will be referred to in the following second preferred embodiment.

The drive control unit 40 determines the type of the image on the basis of the beam current J. For example, the drive control unit determines that the image is a binary image of a normal display when an average of the beam current J over a predetermined period e.g. over one frame is smaller than a predetermined reference value, and determines that the image is a binary image of a reverse display when the average is larger than another predetermined reference value larger than the former one. The drive control unit 40 also determines that the image is an analogue image such as a moving picture when the average falls between two predetermined reference values.

In the device 101, since the frequency characteristic of the gain is adjusted on the basis of the type of the image, visually desirable image is displayed irrespective of the type of the image, as mentioned above. Moreover, since the frequency characteristic is controlled according to the detection signal obtained by the beam current detection unit 5, visually desirable image quality is automatically obtained even if the type of the image changes.

Furthermore, since the inductor 3 inductance of which is variable is employed, it is possible to control the high frequency component readily and electrically. In particular, since the inductor 3 is interposed into the path between the amplifier 20 and the cathode of the CRT 1, it is possible to form the amplifying unit 2 by replacing the inductor 97 provided in the conventional device 150 with the inductor 3. Accordingly, design and manufacturing sources such as design data in the conventional device 150 can be used as they are so that design and manufacturing costs can be saved.

Further, since the inductor 3 includes the primary and secondary windings 31, 32 inductively coupling with each other through a mutual inductance, an equivalent inductance in the amplifying unit 2 can be readily adjusted by using the current regulating unit 41. That is, the frequency characteristic can be controlled electrically still more easily. Moreover, it is possible to design the current regulation unit 41 easily and to implement the control by the drive control unit 40 easily and simply because the current regulation unit 41 regulates the current I stepwise only by turning on and off the switches 42 and 43.

<2. Second Preferred Embodiment>

Figure 6:
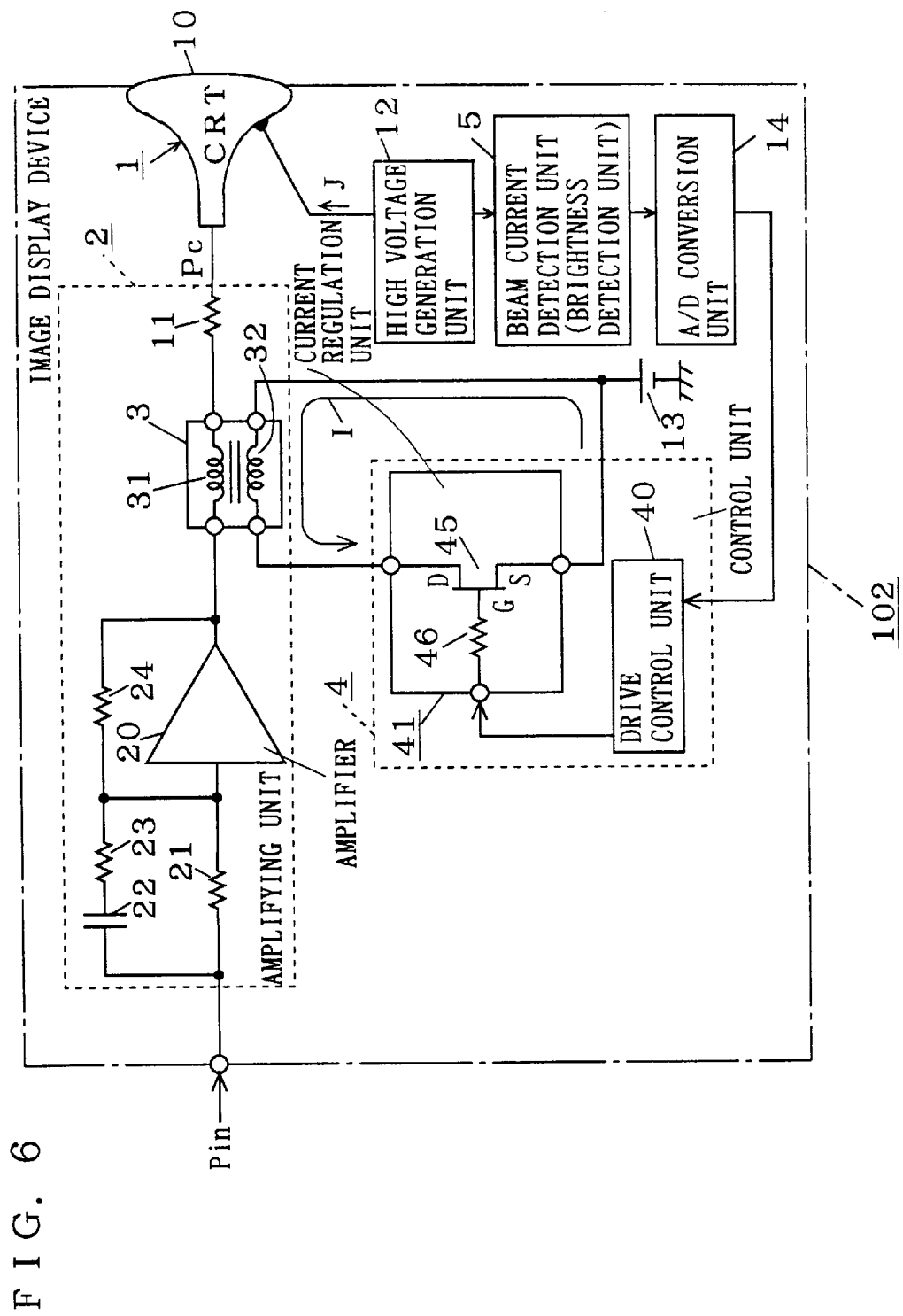
FIG. 6 is a block diagram showing a device of a second preferred embodiment of the present invention.

FIG. 6 is a block diagram showing a structure of an image display device of a second preferred embodiment of the present invention. This device 102 is characteristically different from the device 101 (FIG. 1) of the first preferred embodiment in that the path of the current I provided in the current regulation unit 41 is single and the current restriction characteristic of the path is continuously varied by a transistor interposed into the path. A junction FET (Field Effect Transistor) 45, for example, is employed as the transistor interposed into the path as FIG. 6 shows. The FET 45 is preferably a depletion mode FET.

The source electrode S and drain electrode D of the FET 45 are connected to the two ends of the secondary winding 32, respectively. The source electrode S is further connected to a voltage source 13 so that the FET 45 can operate in a depletion mode. The drive control unit 40 transmits a drive voltage signal as the control signal. The drive voltage signal is inputted to the gate electrode G of the FET 45 as the gate voltage through a resistor 46 connected to the gate electrode G.

Figure 7:
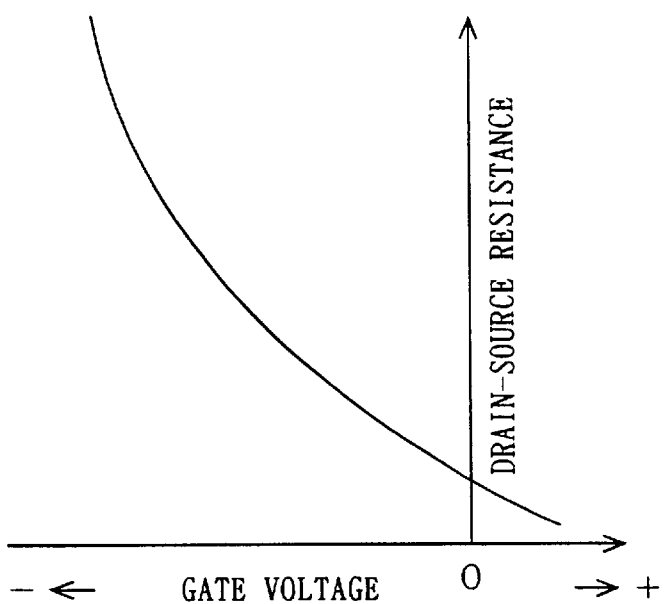
FIG. 7 is a graph showing a characteristic of an FET of the second preferred embodiment.

FIG. 7 is a graph showing a relation between the gate voltage of the FET 45 and the drain-source resistance. The FET 45 turns off when the gate voltage sufficiently large in a negative direction is applied, and turns on when the gate voltage sufficiently large in a positive direction is applied. In the nonsaturation region between the two extremes, the drain-source resistance decreases as the gate voltage increases in a positive direction. Since the range of the nonsaturation region depends on the characteristics of the inductor 3 (e.g. number of turns of the windings), the characteristics of the inductor 3 are properly selected so that the FET 45 operates within the nonsaturation region. The range of the control signal is also properly adjusted so that the FET 45 operates within the nonsaturation region.

Figure 8:
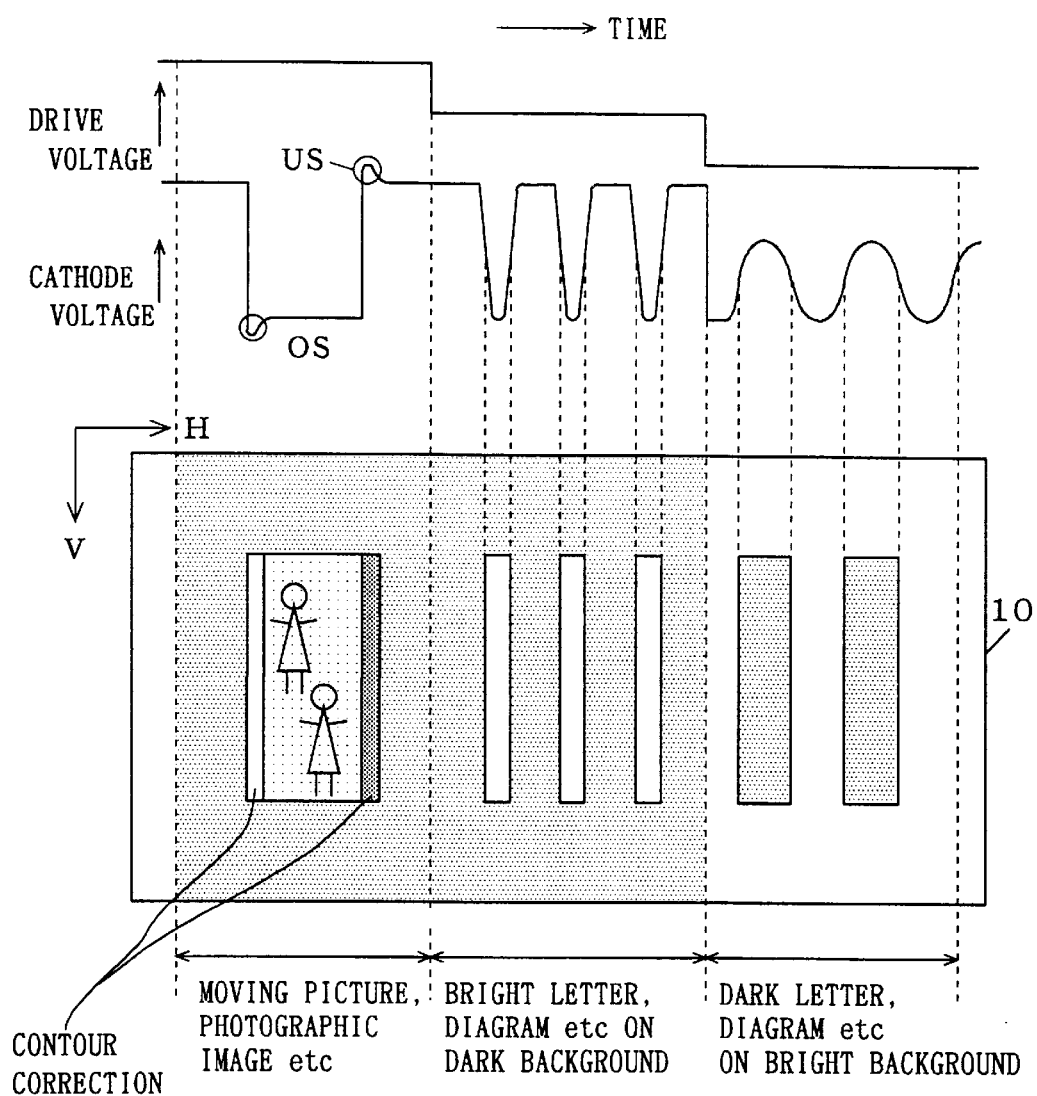
FIG. 8 is an explanatory drawing showing an operation of the device of the second preferred embodiment.

FIG. 8 is an explanatory drawing showing a relation among the control signal, the image signal Pc, and the image displayed on the screen 10. Although it is possible to display plural images different in the frequency characteristic alongside on the screen 10 as will be described in the fifth preferred embodiment, FIG. 8 shows three images displayed side by side on the same screen 10 for convenience which are actually displayed on the screen individually.

The drive control unit 40 determines a type of the image in accordance with the beam current J. The drive control unit 40 adjusts the control signal the highest when the image is an analogue image such as a moving picture, adjusts intermediate when the image is a binary image of a normal display, and adjust the lowest (i.e. largest in a negative direction) when the image is a binary image of a reverse display. As a result, the equivalent inductance of the inductor 3, i.e. the inductance of the primary winding 31 rises up in this order.

Therefore, the high frequency component of the gain is the highest for an analogue image, intermediate for a binary image of a normal display, and the lowest for a binary image of a reverse display. The preferable relation in the frequency characteristic among the three images was described in the first preferred embodiment, and the relation shown in FIG. 8 is consistent with the preferable relation. In an analogue image, the image signal Pc is accompanied notably with an overshoot OS and an undershoot US. Accordingly, the contour correction enhancing the contour of the analogue image is implemented so as to make the contour visually clear.

The frequency characteristic for a binary image of a normal display which falls into the intermediate one of the three levels is adjusted at a level similar to that in the conventional device 150 i.e. a standard frequency characteristic. The high frequency component is preferably adjusted higher than the standard one for an analogue image, and adjusted lower for a binary image of a reverse display.

In the device 102, it is possible to vary the frequency characteristic of the gain by controlling the gate voltage of the FET 45 interposed into the single path of the current I, as mentioned above. Although, the foregoing described an example where the frequency characteristic is changed in three steps, it is possible to set the number of the steps larger infinitely and change the frequency characteristic continuously without changing the structure of the current regulation unit 41 because the drain-source resistance of the FET 45 is continuously variable with the gate voltage as FIG. 7 shows. That is, the frequency characteristic can be controlled finer with the structure of the current regulation unit 41 simple.

Figure 9:
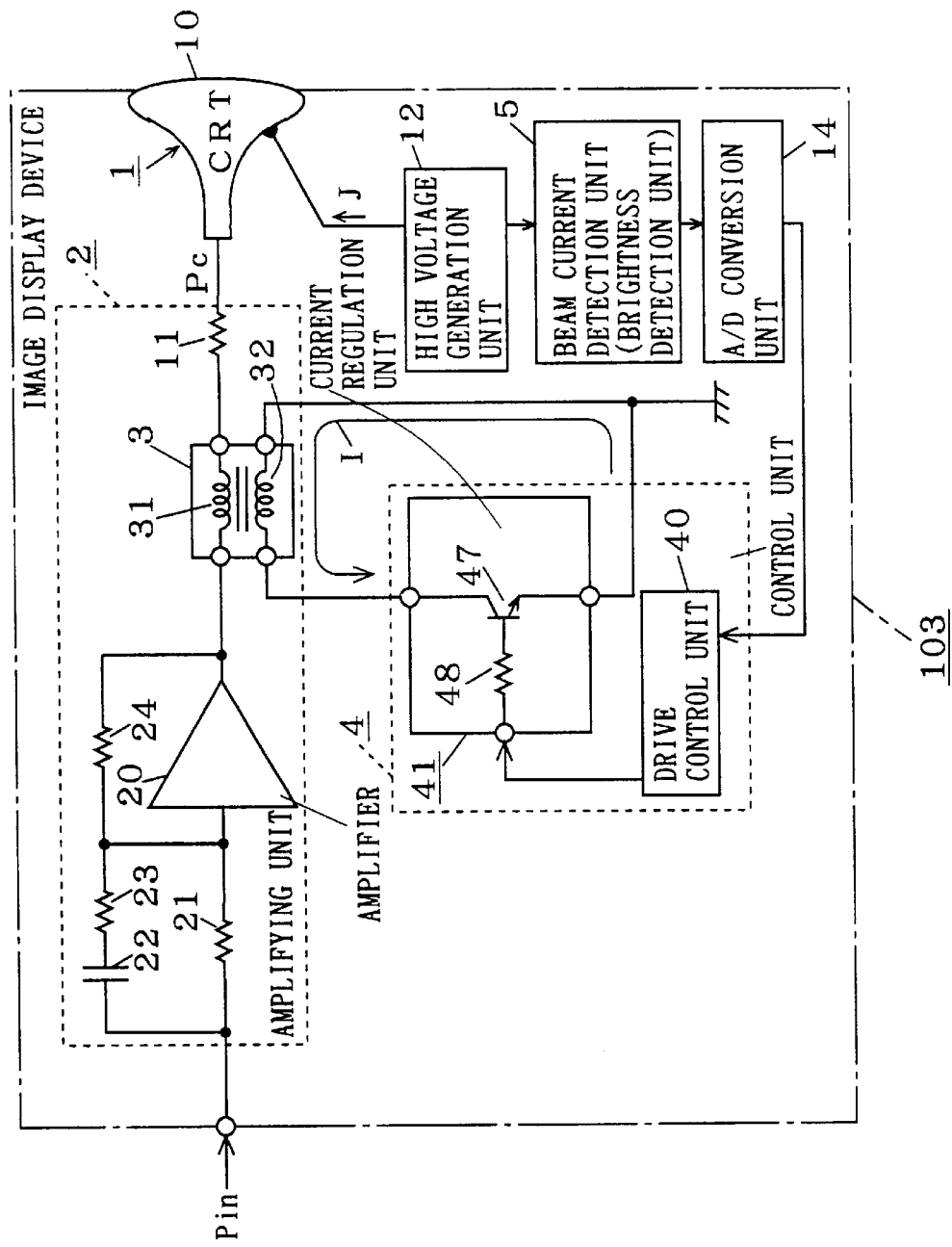
FIG. 9 is a block diagram showing another example of the device of the second preferred embodiment.

Although FIG. 6 showed an example where the FET 45 is provided in the current regulation unit, it is possible to replace the FET 45 with another type of transistor and also replace with a general active element which functions similarly to the transistors operable within a nonsaturation state. FIG. 9 is a block diagram showing an example thereof. In this device 103, a bipolar transistor 47 is used instead of the FET 45.

The emitter electrode and collector electrode of the transistor 47 are connected to the two ends of the secondary windings 32, respectively. The emitter electrode is further connected to a ground potential line i.e. a wiring transmitting ground potential, and thereby the transistor 47 can operate. The drive control unit 40 transmits a current signal as the control signal. The current signal is inputted to the base electrode of the transistor 47 as the base current through a resistor 48 connected to the base electrode.

<3. Third Preferred Embodiment>

Figure 10:
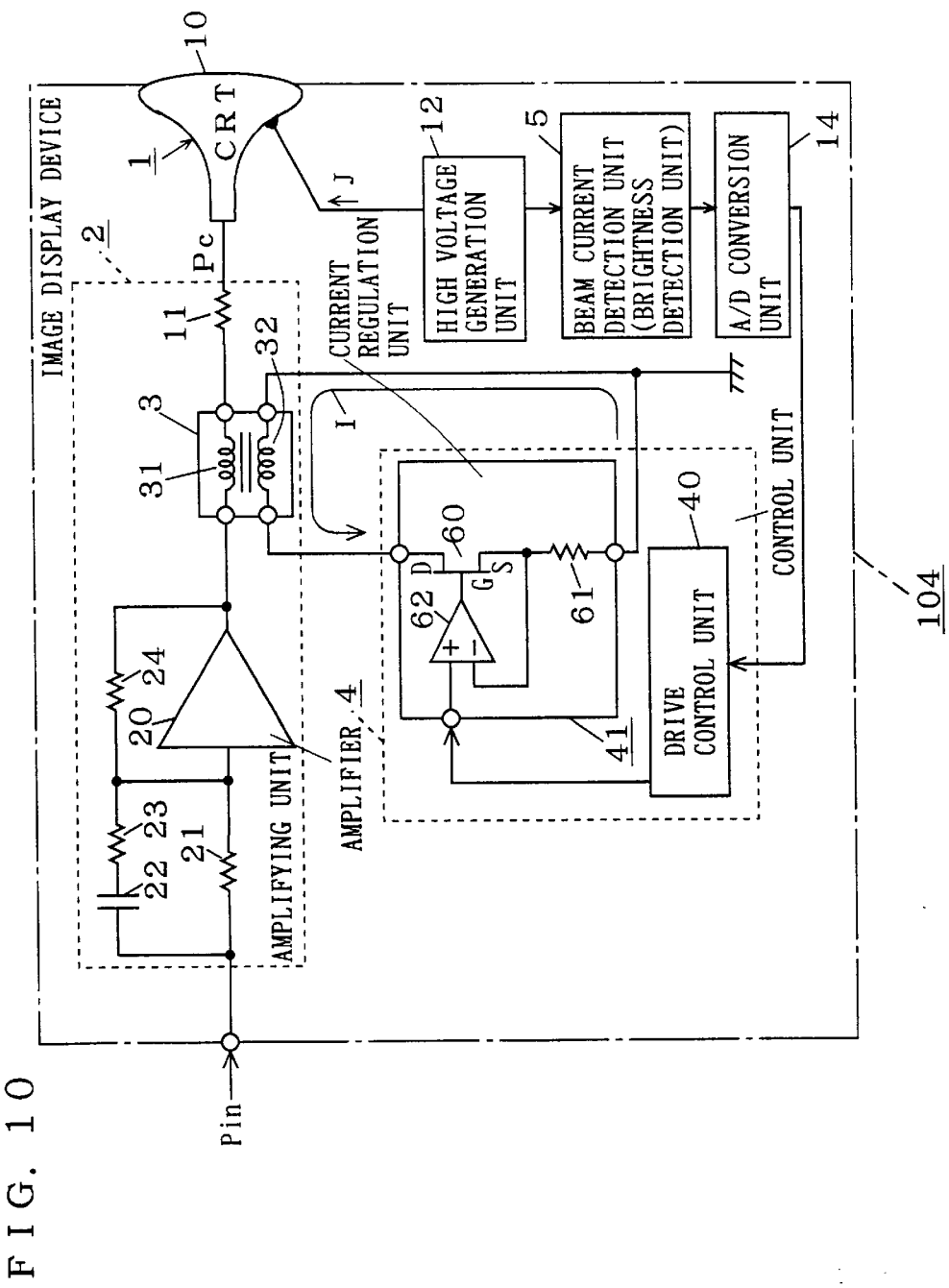
FIG. 10 is a block diagram showing a device of a third preferred embodiment of the present invention.

FIG. 10 is a block diagram showing a structure of an image display device of a third preferred embodiment of the present invention. This device 104 is characteristically different from the device 102 (FIG. 6) of the second preferred embodiment in that a constant current circuit is provided in the current regulation unit 41. The single path of the current I provided in the current regulation unit 41 has a series circuit interposed thereinto comprising an FET 60 and a resistor 61 connected in series with each other. More specifically, the drain electrode D of the FET 60 is connected to one end of the secondary winding 32, the source electrode S of the FET 60 is connected to one end of the resistor 61, and the other end of the resistor 61 is connected to the other end of the secondary winding 32. The other end of the resistor 61 is further connected to a ground potential line.

The gate electrode G of the FET 60 is connected to the output of an operational amplifier 62, and the source electrode S of the FET 60 is further connected to the reverse input of the operational amplifier 62. That is, the voltage drop across the resistor 61 proportional to the current I is fedback to the operational amplifier 62. The drive control unit 40 outputs the control signal in the form of a voltage signal which is inputted to the non-reverse input of the operational amplifier 62.

Accordingly, the drain-source resistance of the FET 60 is so adjusted that the voltage drop across the resistor 61 is held constant i.e. the current I is held constant. Since the constant current I depends on the control signal, it is possible to change the current I variously and continuously with the control signal.

The current I flows with a constant magnitude depending on the control signal flows in the secondary winding 32 even if the characteristics of the FET 60 changes due to inequality, aging, temperature change for example. Thus, the device 104 eliminates the influence of the error in the characteristics of the elements and implements highly precise control of the frequency characteristic with a simple structure.

<4. Fourth Preferred Embodiment>

Figure 11:
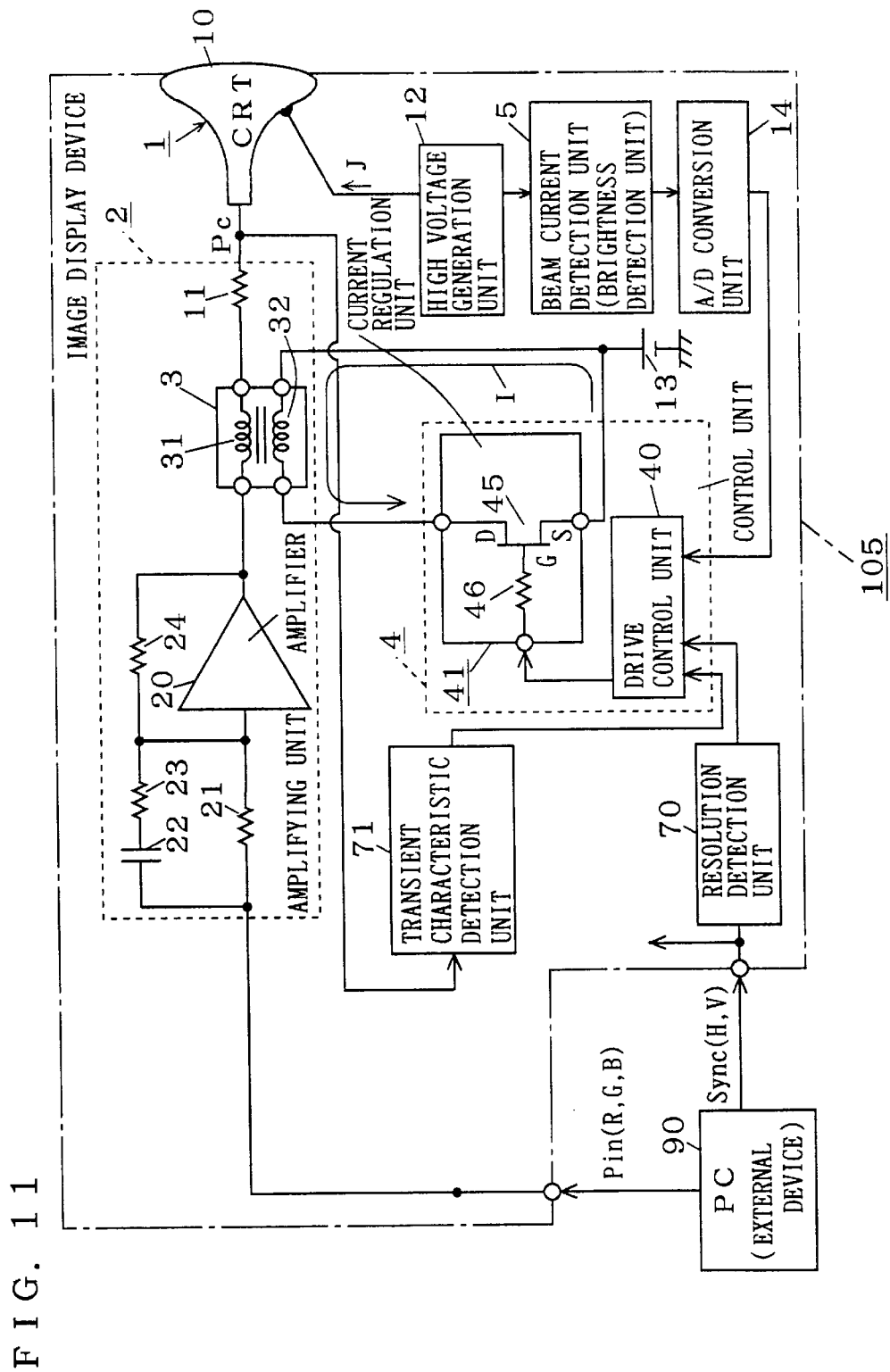
FIG. 11 is a block diagram showing a device of a fourth preferred embodiment of the present invention.

FIG. 11 is a block diagram showing a structure of an image display device of a fourth preferred embodiment of the present invention. This device 105 is characteristically different from the devices 101–104 of the first to third preferred embodiments in that a resolution detection unit 70 and a transient characteristic detection unit 71 are provided. Although FIG. 11 illustrates the current regulation unit 41 (FIG. 6) in the device 102 as the current regulation unit 41, the current regulation units 41 in the device 101, 103 and 104 can be employed as well.

The device is connected to an external device 90 when being used. The external device 90 is a personal computer PC, for example. The external device 90 transmits the image signal Pin and the synchronizing signal Sync to the device 105. The image signal Pin includes three color components Pin(R), Pin(G) and Pin(B). The synchronizing signal Sync includes the horizontal synchronizing signal Sync(H) and the vertical synchronizing signal Sync(V).

The transient characteristic detection unit 71 detects the transient characteristic of the image signal Pc obtained as a result of the image signal Pin passing through the amplifying unit 2. The resolution detection unit 70 detects the resolution of the image signal Pin on the basis of the synchronizing signal Sync. The drive control unit 40 controls the frequency characteristic of the gain of the amplifying unit 2 in accordance with these detected results so as to improve the visual quality of the image.

The synchronizing signal Sync is also supplied to synchronizing and deflection circuits (not shown) which are well known units for scanning the electron beam on the screen 10 of the CRT 1. FIG. 11, therefore, also depicts another path of the synchronizing signal Sync branching off from the path to the resolution detection unit 70.

Figure 12:
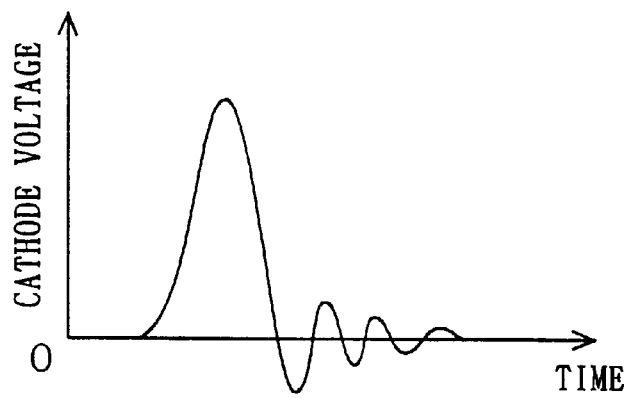
FIGS. 12 to 18 are explanatory drawings showing an operation of the device of the fourth preferred embodiment.
Figure 13:
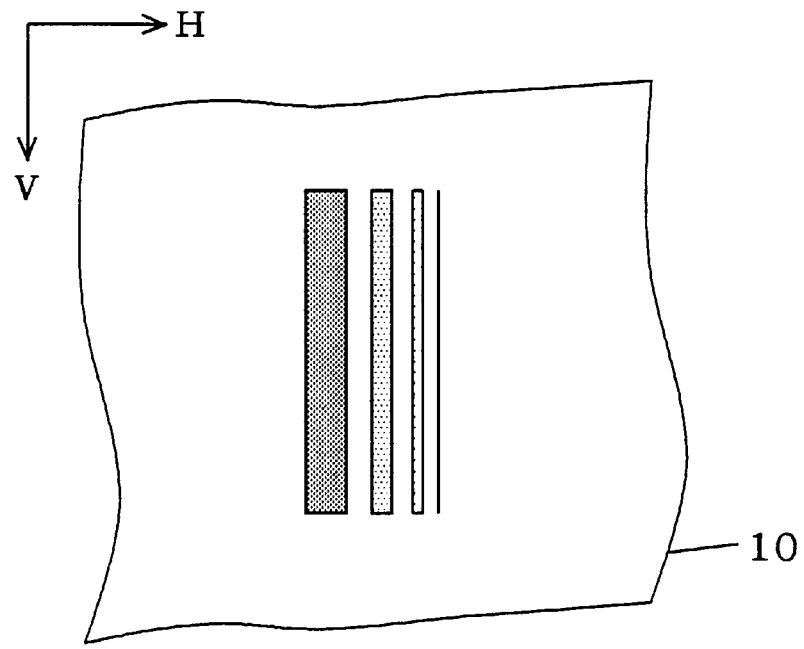
Figure 14:
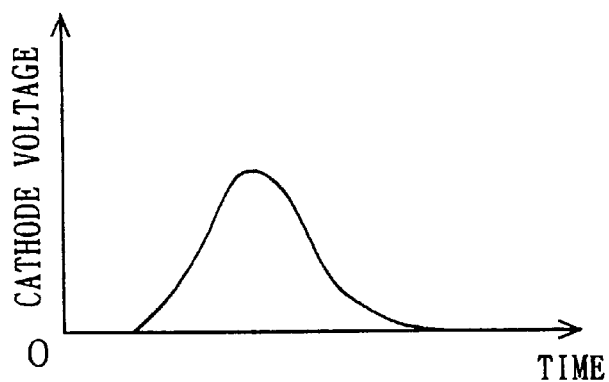
Figure 15:
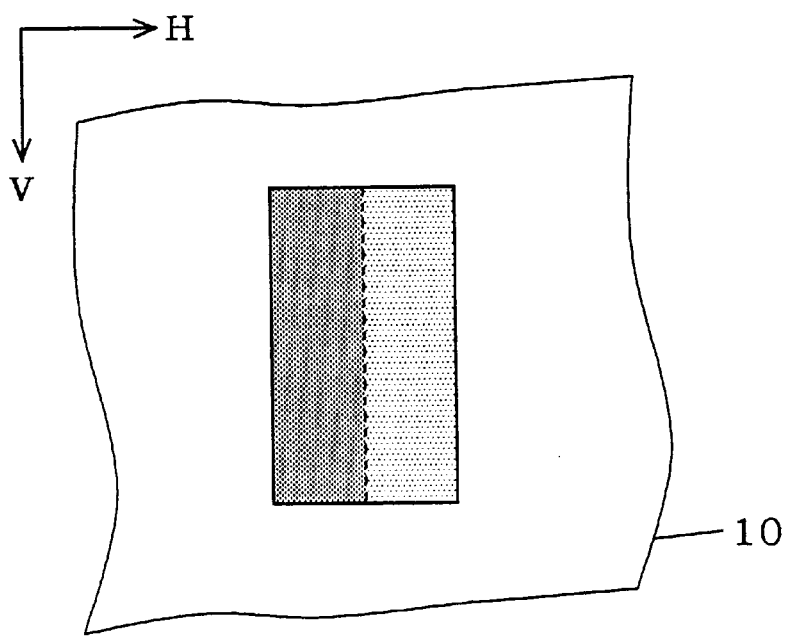

When the high frequency component of the gain of the amplifying unit 2 is excessively high, the image signal Pc outputted from the amplifying unit 2 is accompanied with ringing as FIG. 12 shows as the image signal Pin with pulsive waveform representing one pixel image is inputted. As a result, a distortion reflecting the ringing emerges in the image displayed on the screen 10 as FIG. 13 shows. On the contrary, when the high frequency component is excessively low, the image signal Pc excessively delays converging to the initial value as FIG. 14 shows. As a result, persistence emerges in the image displayed on the screen 10 as FIG. 15 shows.

Figure 16:
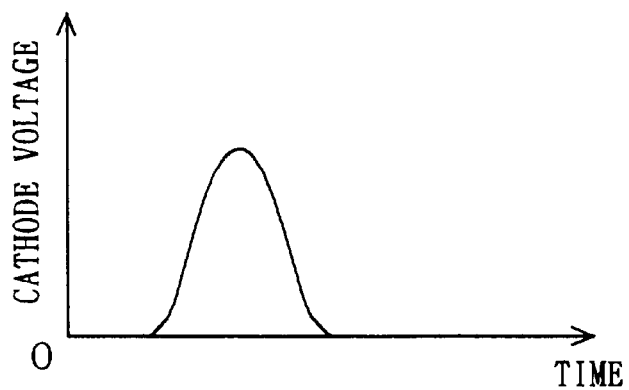
Figure 17:
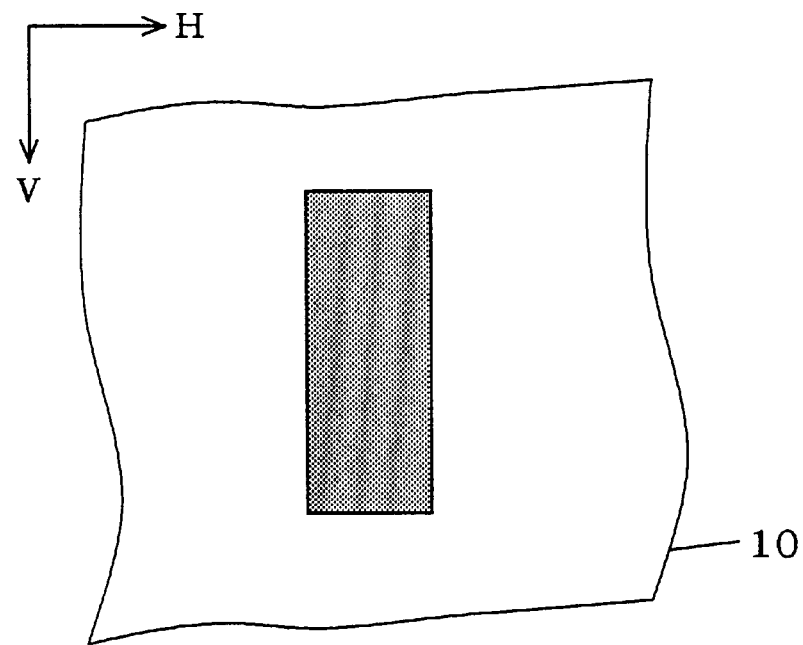

When the frequency characteristic is properly adjusted, the image signal Pc is not accompanied with ringing and converges with an adequate rapidity as FIG. 16 shows. As a result, the screen 10 displays a desirable image without distortion nor persistence as FIG. 17 shows. The transient detection unit 71 detects the waveform of the image signal Pc i.e. the transient characteristic. The transient characteristic is detected by sampling the image signal Pc with higher frequency than the clock cycle of the image signal Pin and converting the same from analogue to digital form, for example.

The drive control unit 40 determines how far the transient characteristic deviates from the target characteristic shown in FIG. 16 according to the digital signal obtained by the transient detection unit 71, and thereafter modifies the frequency characteristic through the current regulation unit 41 and the inductor 350 as to reduce or eliminate the deviation. By repeating this cycle, a proper transient characteristic of the image signal Pc identical with the target is obtained and the desirable image shown in FIG. 17 is displayed on the screen 10 irrespective of the transient characteristic of the inputted image signal Pin. That is, the desirable image is displayed without influence of the characteristics of the external device 90 nor the characteristics of wires connecting the external device 90 and the device 105.

The target transient characteristic is preferably changed depending on the resolution of the image signal Pin outputted by the external device 90. The resolution detection unit 70 is provided for this reason. The resolution of the image signal Pin is defined by the number of pixels lined up in the horizontal direction H and the vertical direction V per one frame (e.g. 1024 pixels×768 pixels) and usually fixed at a certain value for each type of the external device 90.

There is a well known simple relation between the resolution of the image signal Pin and the period of the synchronizing signal Sync. The resolution detection unit 70 receives the synchronizing signal Sync and calculates the period thereof to thereby detect the resolution of the image signal Pin. For this purpose, the period of the synchronizing signal Sync is converted into the number of the clock pulses and thereafter the resolution is detected through digital signal processing, for example.

Figure 18:
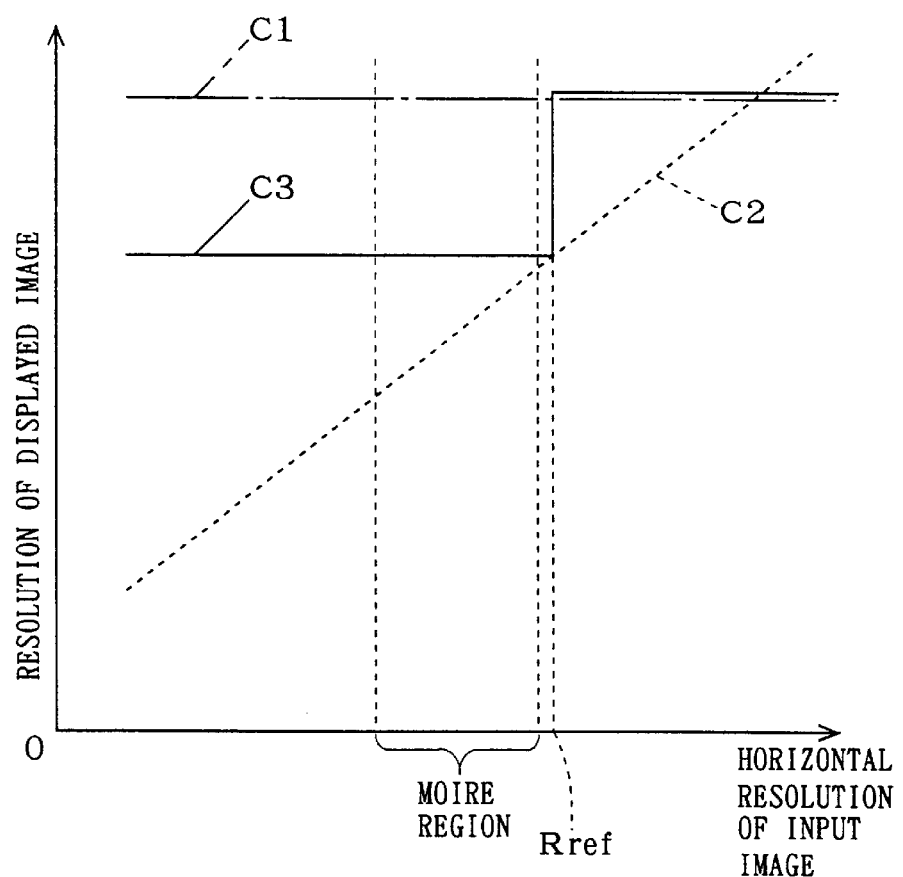

The drive control unit 40 controls the resolution of the image signal Pc i.e. the resolution of the displayed image on the basis of the resolution of the inputted image signal Pin as the graph of FIG. 18 shows, for example. The resolution of the image signal Pc increases as the high frequency component of the gain of the amplifying unit 2 is enhanced. Therefore, the vertical axis of FIG. 18 is equivalent with height of the high frequency component. As is known from FIG. 18, the drive control unit 40 only needs to refer to the horizontal resolution included in the resolution of the image signal Pin. Therefore, the resolution detection unit 70 only needs to detect the horizontal resolution.

The device 105 is so set as to reproduce the maximum resolution of the image signal Pin (shown by a line C1). However, lower resolution of the displayed image is permitted from viewpoint of the visual image quality when the resolution of the image signal Pin is lower. A relation between the image signals Pin and Pc may be given by a line C2, for example.

It is known that moire fringes are likely to emerge on the screen 10 within a certain range of the resolution of the image signal Pin due to the interference between the resolution and the grill pitch. FIG. 18 illustrates the range with "moire region." The position and width of the moire region depends on the resolution (i.e. the diameter of the electron beam displayed on the screen 10) represented by the line C1. In order to prevent the moire fringes from emerging, it is effective to change a relation in the resolution between the image signals Pin and Pc.

For this purpose, a reference resolution Rref is set higher to some extent than the higher edge of the moire region defined by the height of the line C1, for example. The drive control unit 40 determines the resolution of the image signal Pc as high as the line C1 when the resolution of the image signal Pin detected by the resolution detection unit 70 is not lower than the reference resolution Rref. The drive control unit 40 determines the resolution of the image signal Pc at a certain level lower than the line C1 and higher than the line C2 when the resolution of the image signal Pin is lower than the reference resolution Rref. The drive control unit 40 sets the target transient characteristic described above so as to implement the frequency characteristic corresponding to the resolution of the image signal Pc adjusted.

The target transient characteristic is preferably modified depending on a type of the image (e.g. a normal display or a reverse display). Therefore, the drive control unit 40 in the device 105 refers to the beam current J detected by the beam current detection unit 5 as well as the detected results obtained by the transient characteristic detection unit 71 and the resolution detection unit 70. The drive control unit 40 modifies the target so as to enhance the high frequency component for a binary image of a normal display and reduce the same for a binary image of a reverse display, for example.

In the device 105, the resolution detection unit 70, the transient characteristic detection unit 71, and the beam current detection unit 5 are provided, and the drive control unit 40 performs the control by referring to the detection signals obtained by these units, as described above. Accordingly, an image is automatically displayed which is synthetically optimized in terms of the visual image quality taking account of difference in the resolution of the inputted image signal Pin and difference in the transient characteristic (i.e. pulsive waveform) of the inputted image signal Pin as well as the type of the image.

The image signal Pin transmitted from the external device 90 to the device 105 may have other color components e.g. YIQ components than RGB components Pin(R,G,B). The transient detection unit 71 may detect the transient characteristic for all the three components or for one of them as a representative. The more components are detected, the more precise the detection of the transient characteristic is.

The device can be modified so as to comprise only one of the resolution detection unit 70 and the transient characteristic detection unit 71. Further, the beam current detection unit 5 and the A/D conversion unit 14 can be removed. In general, it is possible to optimize the visual quality of the displayed image taking account only one of the difference in the type of the image, the difference in the resolution of the inputted image signal Pin, and the difference in the transient characteristic, or synthetically taking account of any combination of those. The drive control unit 40 can control the frequency characteristic so as to implement the relation shown in FIG. 18 only according to the resolution detected by the resolution detection unit 70, for example.

Figure 19:
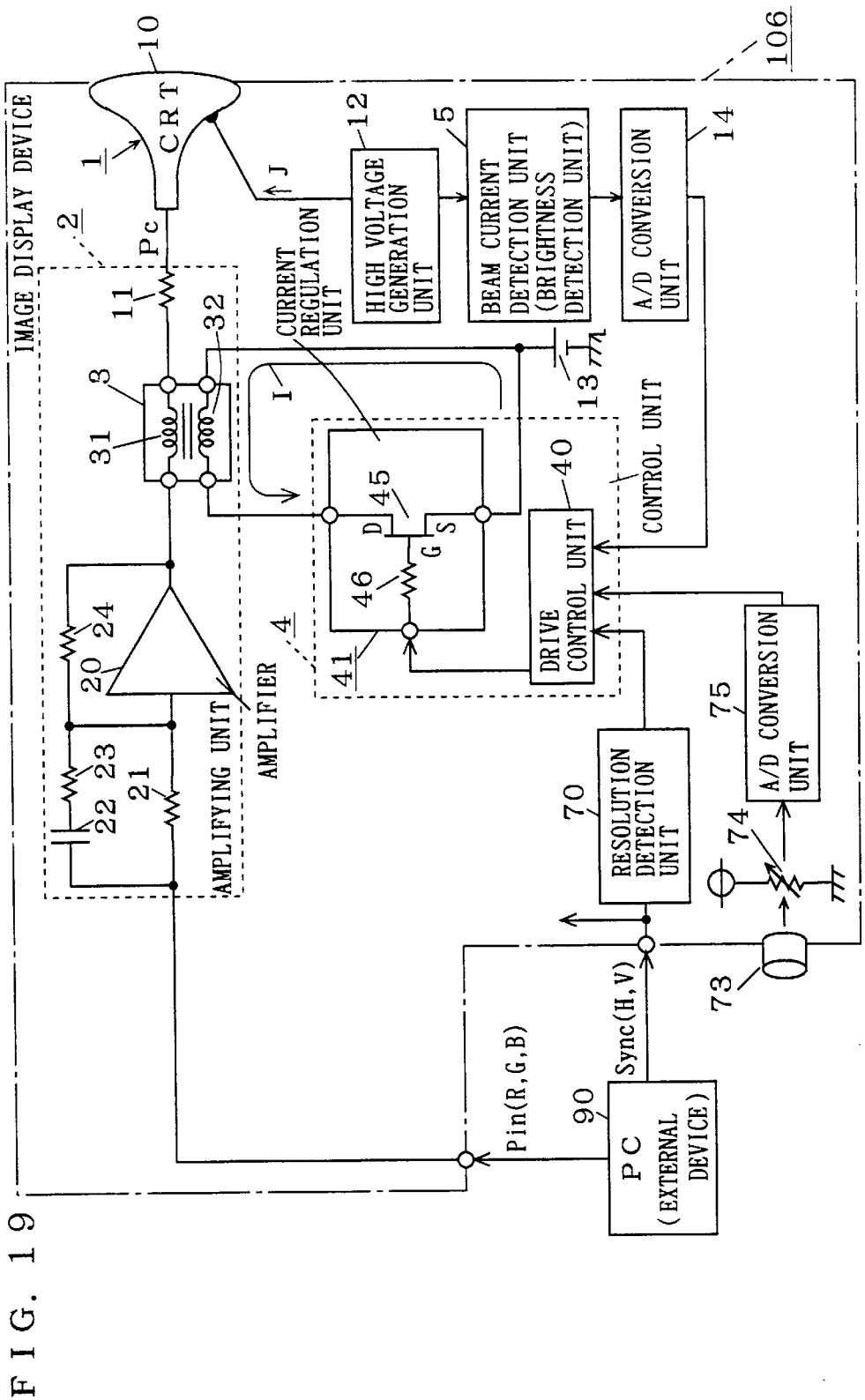
FIG. 19 is a block diagram showing another example of the device of the fourth preferred embodiment.

Furthermore, the device 105 can be modified so that the frequency characteristic is variable with external manual operation as FIG. 19 shows. The device 106 shown in FIG. 19 comprises an operation unit 73, a variable resistor 74, and an A/D conversion unit 75 instead of the transient detection unit 71. The variable resistor 74 is connected to a positive potential line and a ground potential line. An operator can change the voltage drop generated across the variable resistor 74 by manually operating the operation unit 73. The voltage drop is converted into a digital signal by the A/D conversion unit 75 and thereafter transmitted to the drive control unit 40.

The drive control unit 40 refers to the signal transmitted from the A/D conversion unit 75 instead of the detection signal obtained by the transient characteristic detection unit 71. As a result, the operator can modify by manual operation the frequency characteristic adjusted according to the detection signals obtained by the resolution detection unit 70 and the beam current detection unit 5. The operator can operate the operation unit 73 watching the image displayed on the screen 10 so as to obtain a proper frequency characteristic, for example. In particular, the operator can continuously modify the frequency characteristic when the FET 45 operable within a nonsaturation region is provided as in the device 106.

<5. Fifth Preferred Embodiment>

Figure 20:
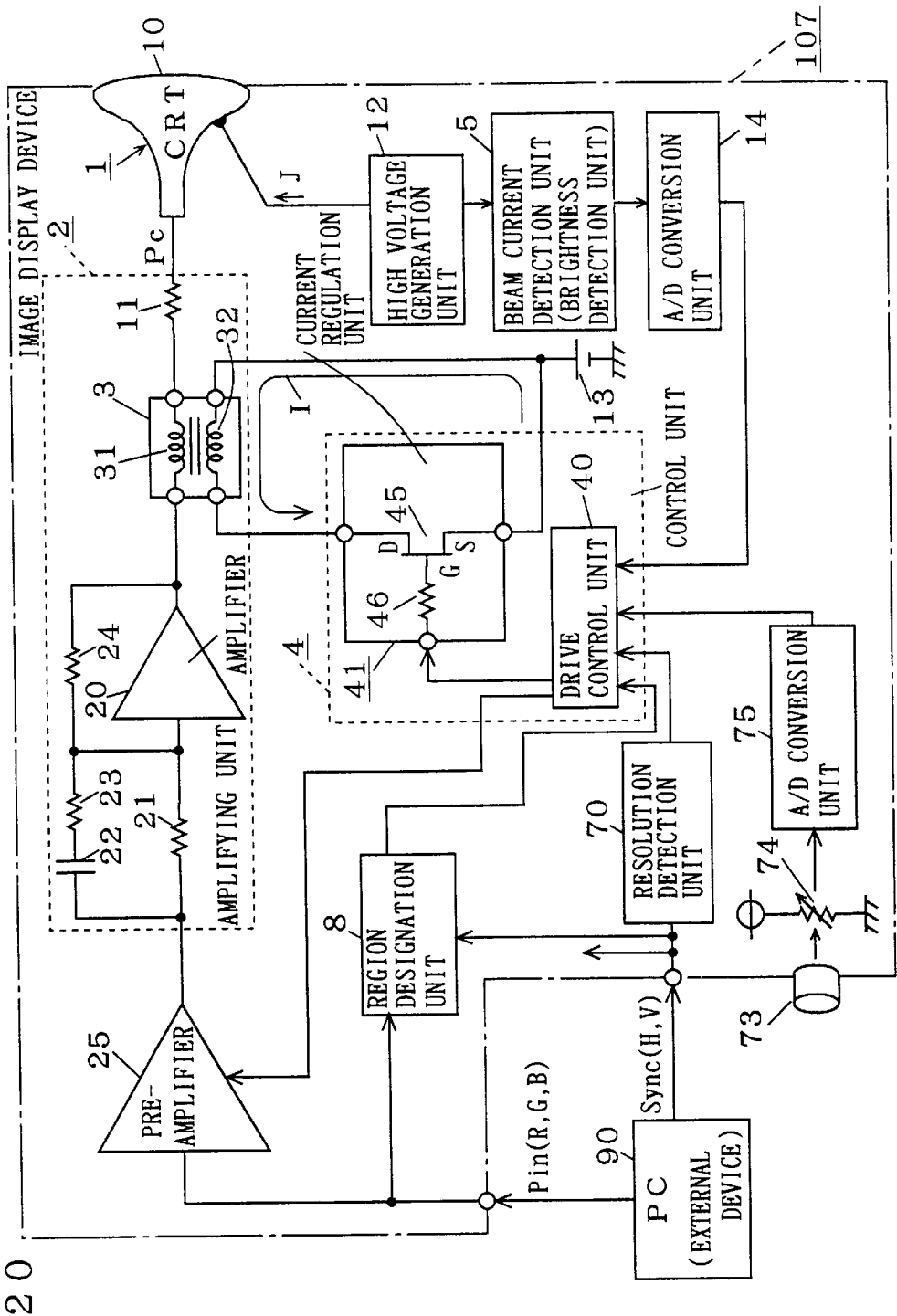
FIG. 20 is a block diagram showing a device of a fifth preferred embodiment of the present invention.

FIG. 20 is a block diagram showing a structure of an image display device of a fifth preferred embodiment of the present invention. This device 107 is characterized by comprising a region designation unit 8. The drive control unit 40 controls the frequency characteristic according to one or more, for example, of the detection signals obtained by the resolution detection unit 70 and the beam current detection unit 5, and the operation of the operation unit 73 as described in the first to fourth preferred embodiments, selectively for a particular region (e.g. a sub-screen) designated by the region designation unit 8 within an overall image (i.e. entire one frame image). The device 107 is an example obtained by adding the region designation unit 8 to the device 106 (FIG. 19).

The region designation unit 8 detects a position signal superimposed on the image signal Pin or the synchronizing signal Sync and transmitted from the external device 90 to thereby designate the particular region (hereinafter, referred to as "a control window"). The position signal represents the position of the control window. As an explanatory diagram of FIG. 21 shows, the position signal Cs corresponding to the control window W set within the overall image capable of being displayed on the screen 10 is superimposed on the synchronizing signal Sync or the image signal Pin at a position corresponding to the edge of the control window W.

It depends on the external device 90 as to which the position signal is superimposed on, the synchronizing signal Sync, the image signal Pin, or both the signals. The device where the position signal Cs is superimposed on the image signal Pin advantageously allows the external device 90 to output the position signal Cs only defined by the software (i.e. program), which also defines the image signal Pin, without a hardware for generating the position signal Cs.

Figure 21:
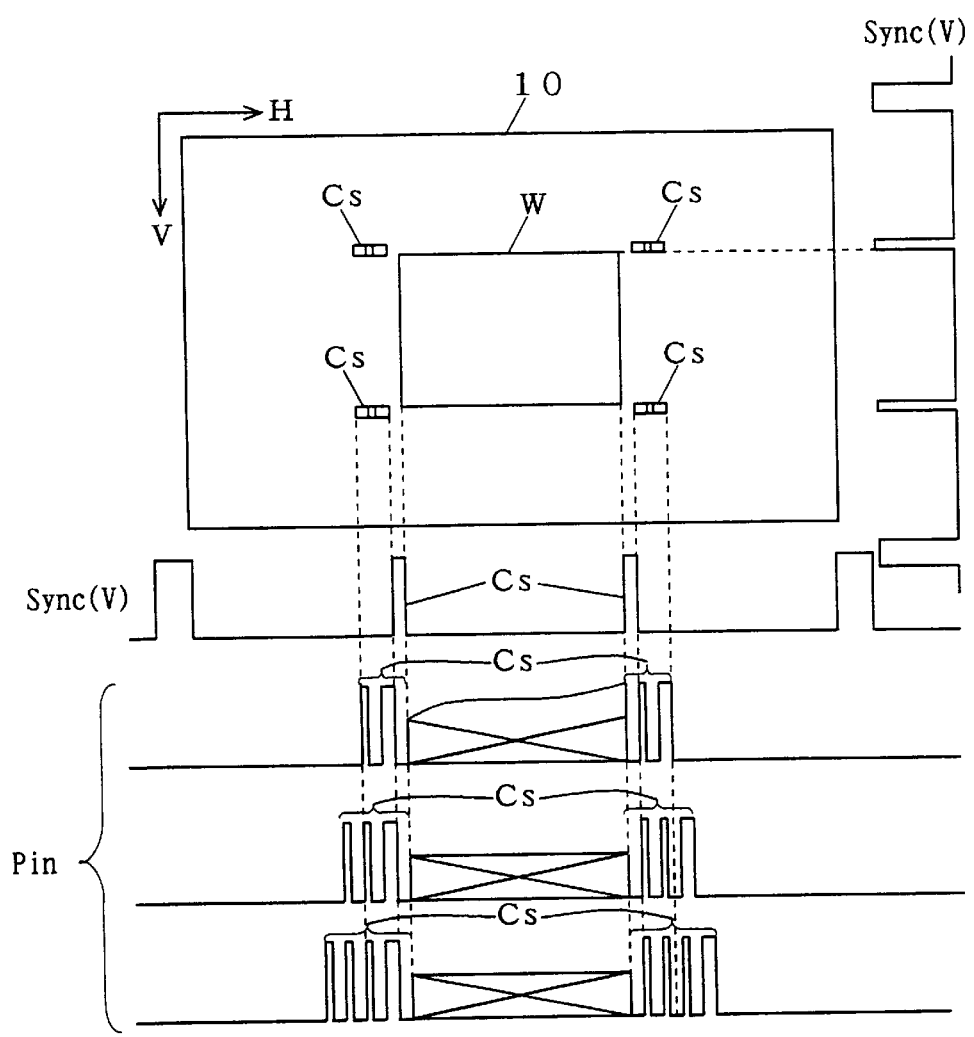
FIG. 21 is an explanatory diagram showing an operation of the device of the fifth preferred embodiment.

Although FIG. 21 illustrates an example where the position signal Cs superimposed on the synchronizing signal Sync is superimposed both on the horizontal synchronizing signal Sync(H) and on the vertical synchronizing signal Sync(V), it may be only superimposed on the horizontal synchronizing signal Sync(H). The position signal Cs superimposed on the image signal Pin may be superimposed on one, two or all of the three components Pin(R, G, B) of the image signal Pin. Generally, the more signals the position signal Cs is superimposed on, the more precisely the position signal Cs is detected.

Figure 22:
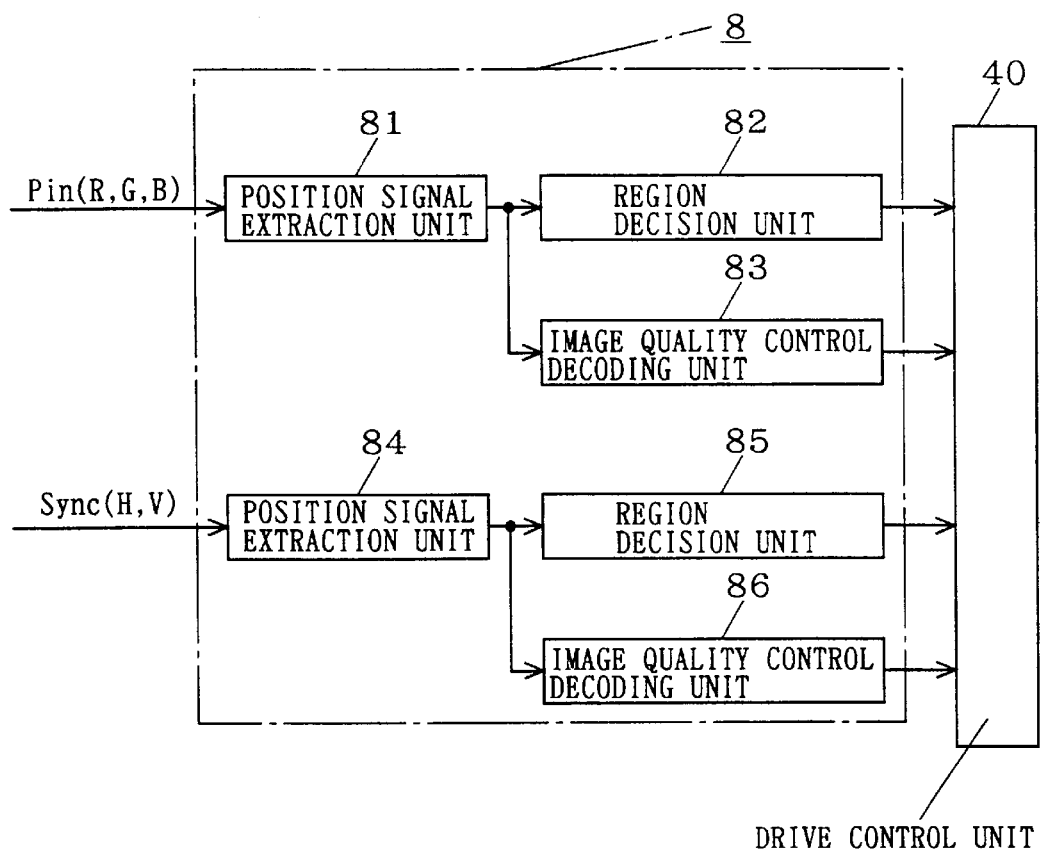
FIG. 22 is a block diagram showing a region designation unit of the fifth preferred embodiment.

FIG. 22 is a block diagram showing the internal structure of the region designation unit 8. A position signal extraction unit 81 extracts the position signal Cs superimposed on the image signal Pin. A position signal extraction unit 84 extracts the position signal Cs superimposed on the synchronizing signal Sync. When the position signal Cs is superimposed on the image signal Pin, the image signal Pin is preferably erased or weaken at a position where the position signal Cs is interposed so as to facilitate extracting the position signal Cs. Accordingly, the screen 10 displays an image corresponding to the position signal Cs at an edge or edges of the control window W along the horizontal direction H as FIG. 21 shows. As a result, an operator can easily and visually recognize the position of the control window W within the overall image.

Referring again to FIG. 22, the position signal Cs extracted by the position signal extraction unit 81 is transmitted to the region decision unit 82. The region decision unit 82 finds the position of the position signal Cs in the image signal Pin to thereby decide the position of the control window W in the overall image. As a result, the signal designating the position of the control window W is transmitted from the region decision unit 82 to the drive control unit 40.

Similarly, the position signal Cs extracted by the position signal extraction unit 84 is transmitted to the region decision unit 85. The region decision unit 85 finds the position of the position signal Cs in the synchronizing signal Sync to thereby decide the position of the control window W in the overall image. As a result, the signal designating the position of the control window W is transmitted from the region decision unit 85 to the drive control unit 40.

Thus, the region designation unit 8 comprises two position signal processing systems respectively for dealing with the image signal Pin and the synchronizing signal Sync. Any one of the external devices 90 superimposing the position signal Cs on the synchronizing signal Sync, the image signal Pin, and both thereof is connectable to the device 107. The drive control unit 40 performs various controls described in the first to fourth preferred embodiments selectively for the control window W designed by the signal transmitted from one of the region decision units 82 and 85 or both thereof. When various types of the external device 90 are not required to be connectable, the region designation unit 8 may only comprise one position signal processing system instead of comprising the full two systems, which restricts the external device 90 to a particular type.

Referring again to FIG. 21, the position signal Cs can have various patterns as FIG. 21 illustrates for the position signal Cs superimposed on the image signal Pin. The position signal Cs does not only represent the position of the control window W by the position of the same in the image signal Pin and the Synchronizing signal Sync, but also can represent the type of the image quality to be controlled for the control window W. The image quality to be controlled may include one unadjustable only with the frequency characteristic such as brightness and contrast of the image as well as one adjustable with the frequency characteristic such as the contour correction.

The pattern illustrated in FIG. 21 is formed of a sequence of pulses having various pulse number, pulse intervals and pulse widths, and is equivalent with a bar code represented by the sequence of pulses. The position signal Cs may have other patterns than an example shown in FIG. 21. The position signal Cs superposed on the image signal Pin can have any pattern on condition that the pattern is distinguished from the image signal Pin.

The region designation unit 8 further comprises image quality control decoding units 83 and 86 as FIG. 22 shows. The image quality control decoding units 83 and 86 each decode the pattern of the position signal Cs extracted by the position signal extraction units 81 and 84, and decide the type of image quality to be controlled. Each of the image quality control decoding units 83 and 86 transmits a signal designating the type of the image quality to be controlled to the drive control unit 40. The drive control unit 40 controls the image quality designated by the signal transmitted from one or both of the image quality control decoding units 83 and 86, for the control window W.

For example, the contour correction is performed or the brightness is changed for the control window W. The drive control unit 40 transmits the control signal to a preamplifier 25 for adjusting the brightness and contrast of the image displayed on the screen 10 as well as controls the frequency characteristic through the current regulation unit 41. The drive control unit 40, thereby, also controls image quality uncontrollable with the frequency characteristic e.g. the brightness and the contrast as the position signal Cs designates.

FIG. 8 referred to in the second preferred embodiment shows the three images displayed side by side on the same screen 10 merely for convenience. The device 107 of the fifth preferred embodiment, however, can display three types of images actually side by side on the screen 10 as FIG. 8 shows. The frequency characteristic is individually and properly adjusted for the three types of the images.

The device 107 selectively controls the image quality for the control window W within the overall image on the basis of the designation given by the external device 90, as described above. The device 107 also allows the external device 90 to designate the type of the image quality to be controlled. The visual image quality, thereby, can be flexibly controlled and improved for various types of images to be displayed.

<6. Sixth Preferred Embodiment>

Figure 23:
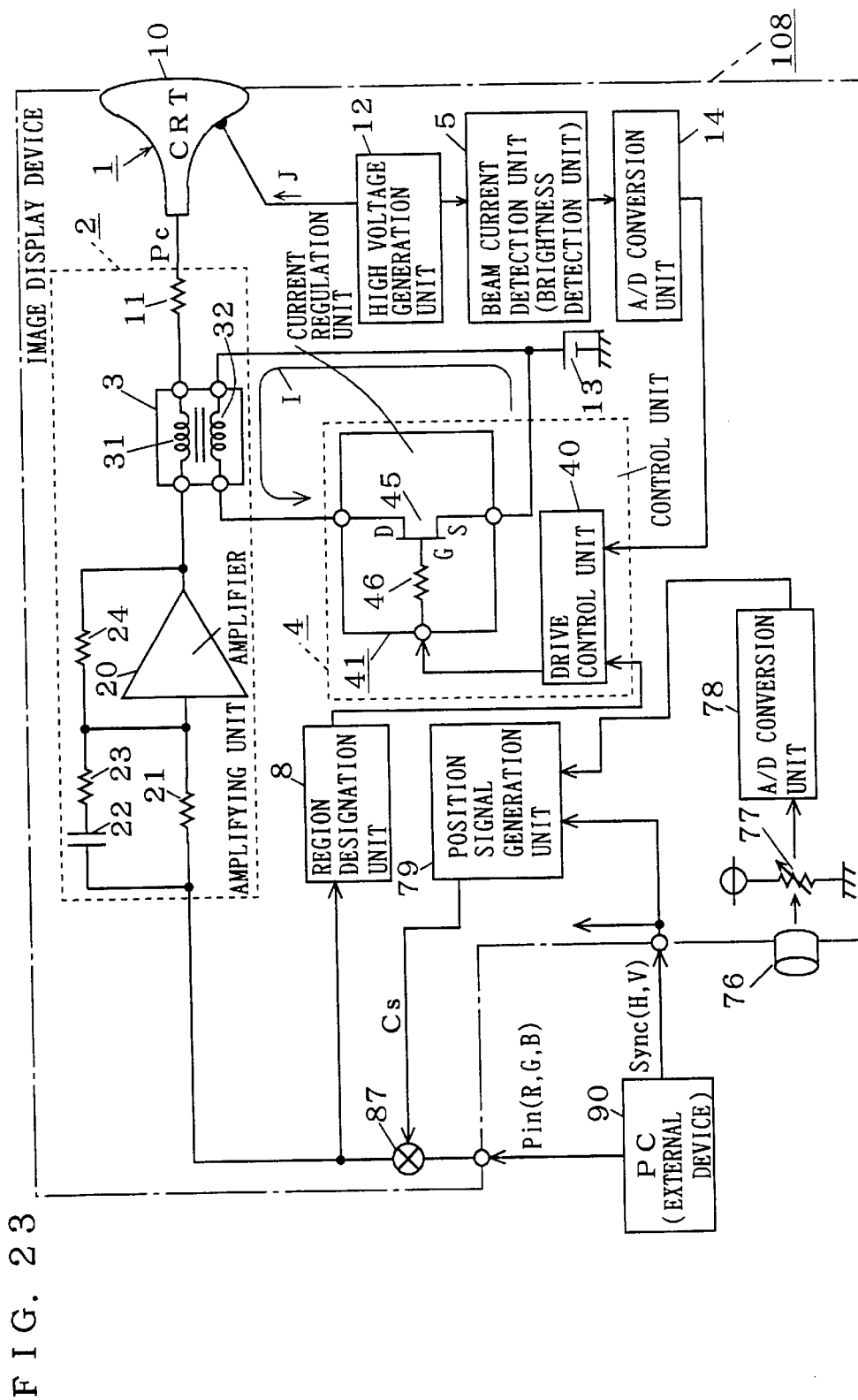
FIG. 23 is a block diagram showing a device of a sixth preferred embodiment of the present invention.

FIG. 23 is a block diagram showing a structure of an image display device of a sixth preferred embodiment of the present invention. This device 108 characteristically allows an operator to manually designate the position of the control window W. Specifically, the device 108 comprises an operation unit 76, a variable resistor 77, an A/D conversion unit 78, and a position signal generation unit 79 so as to generate the position signal Cs in accordance with the operation of the operator. The variable resistor 77 is connected to a positive potential line and a ground potential line, for example.

The operator can change the voltage drop generated across the variable resistor 77 by manually operating the operation unit 76. The voltage drop is converted into a digital signal by the A/D conversion unit 78 and thereafter transmitted to the position signal generation unit 79. The position signal generation unit 79 generates the position signal Cs representing the position of the control window W designated by the operation unit 76 in accordance with the digital signal outputted from the A/D conversion unit 78. The position signal generation unit 79 refers to the synchronizing signal Sync while generating the position signal Cs to thereby output the position signal Cs in timing corresponding to the position of the control window W.

A signal mixing unit 87 superimposes the position signal Cs outputted by the position signal generation unit 79 on the image signal Pin transmitted from the external device 90. The signal mixing unit 87 superimposes the position signal Cs at a position on the image signal Pin reflecting the position of the control window W in the overall image. The region designation unit 8 extracts the position signal Cs from the signal outputted by the signal mixing unit 87, determines the position of the control window W represented by the position signal Cs, and designates the window W to the drive control unit 40. The region designation unit 8 only needs to comprise the position signal extraction unit 81 and the region decision unit 82 among the components of the region designation unit 8 (FIG. 22) in the device 107.

Figure 24:
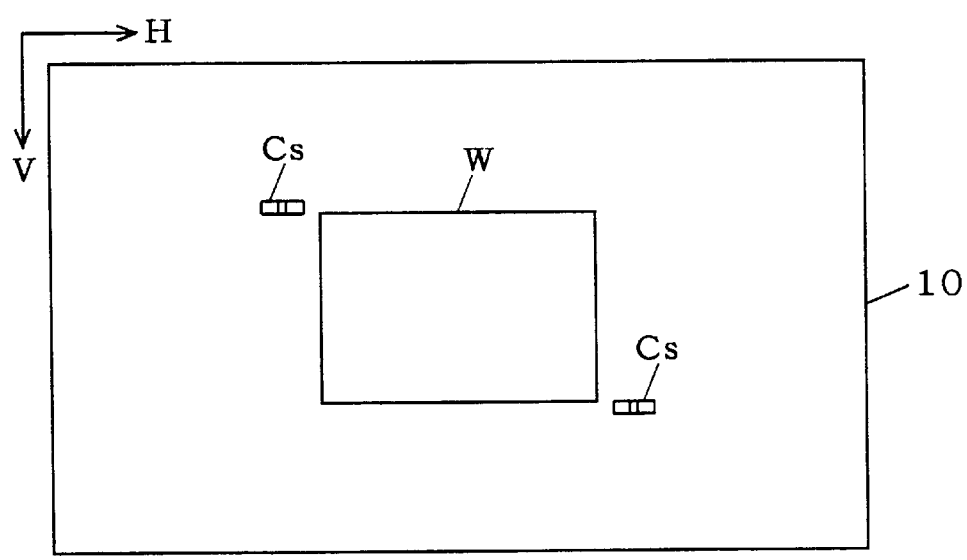
FIG. 24 is an explanatory diagram showing an operation of the device of the sixth preferred embodiment.
Figure 25:
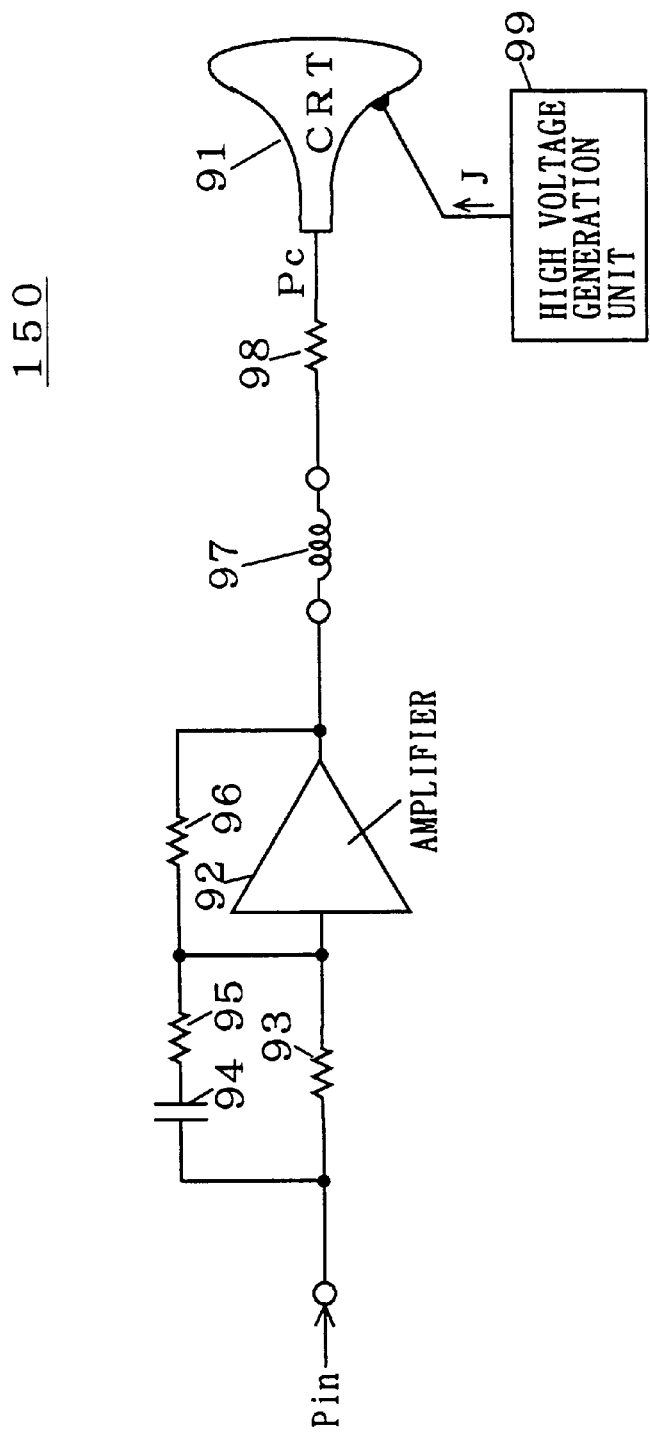
FIG. 25 is a block diagram showing a conventional device.

Since the amplifying unit 2 is supplied with the position signal Cs as well as the image signal Pin, the screen 10 displays the position signal Cs at the upper left corner and the lower right corner of the control window W as FIG. 24 shows. The operator can visually recognize the position of the control window W by watching the position signal Cs. Therefore, the operator can operate the operation unit 76 while watching the position signal Cs so as to freely move the control window W within the overall image. Thus, the device 108 advantageously allows an operator to manually and freely designate the position of the control window W within the overall image.

<7. Modifications>

(1) Although the image signal Pc amplified by the amplifying unit 2 is inputted to the cathode of the CRT 1; i.e. the CRT 1 is a cathode voltage control type in the aforementioned preferred embodiments, the CRT 1, needless to say, may also be a grid voltage control type.

(2) Although the inductor 3 is interposed into the path between the output of the amplifier 20 and the CRT 1 in the aforementioned preferred embodiments, it may also be provided in another portion of the amplifying unit 2 affecting the frequency characteristic of the gain. The inductor 3 interposed into the path between the output of the amplifier 20 and the CRT 1, however, produces the effects described in the first preferred embodiment.

(3) Any variable inductor the inductance of which is electrically adjustable can be used instead of the inductor 3 having plural windings coupling with mutual inductance. A variable inductor including a single winding in which the magnetic core is electrically adjustable in position relative to the winding or gap width is applicable, for example. The inductor 3, however, has the effects described in the first preferred embodiment.

(4) The device 106 (FIG. 19) can be so modified as not to comprise any one of the resolution detection unit 70, the transient characteristic detection unit 71, and the beam detection unit 5, but instead as to comprise the operation unit 73, the variable resistor 74, and the A/D conversion unit 75, for simple structure. In this modification, the frequency characteristic is only controlled by manual operation. An operator can manually operate the operation unit 73 while watching the screen 10 so as to achieve the frequency characteristic optimum for the displayed image. The device having the resolution detection unit 70, the transient characteristic detection unit 71, and the beam detection unit 5, however, has the effects described in the fourth preferred embodiment.

(5) In the aforementioned preferred embodiments, an image output unit for displaying the image represented by the image signal is formed of the CRT 1. However, any image output unit which allows the frequency characteristic of the displayed image to be adjusted by the variable inductor provided in the amplifying unit 2 is applicable in the present invention. In particular, those image output units can also be used which do not require the frequency characteristic to be controlled through the variable inductor in the fifth and sixth preferred embodiments.

While the invention has been shown and described in detail, the foregoing description is in all aspects illustrative and not restrictive. It is therefore understood that numerous modifications and variations can be devised without departing from the scope of the invention.

I claim:

1. An image display device, comprising:

an image output unit for displaying an overall image represented by an image signal;

a region designation unit for designating a particular region within said overall image, said region designation unit including a position signal extraction unit for extracting a position signal from a predetermined signal on which the position signal is superimposed and received by the image display device, and a region decision unit for deciding said particular region on a basis of said position signal; and a control unit for selectively controlling an image quality of an image for said particular region.

2. The image display device of claim 1, wherein said predetermined signal is a synchronizing signal.

3. The image display device of claim 1, wherein said predetermined signal is said image signal.

4. The image display device of claim 2, wherein said position signal represents a type of said image quality to be controlled, said region designation unit further comprises an image quality control decoding unit for decoding said position signal into said type of said image quality, and said control unit selectively controls said type of said image quality based on said image quality.

5. The image display device of claim 3, wherein said position signal represents a type of said image quality to be controlled, said region designation unit further comprises an image quality control decoding unit for decoding said position signal into said type of said image quality, and said control unit selectively controls said type of said image quality based on said image quality.

6. The image display device of claim 1, wherein said image display device further comprises an operation unit manually operable, and said region designation unit varies said particular region depending on an operation of said operation unit.

7. The image display device of claim 6, wherein said image display device further comprises:

- a position signal generation unit for generating a position signal which represents a position of said particular region in said overall image; and
- a signal mixing unit for superposing said position signal on said image signal.

8. The image display device of claim 2, wherein said image display device further includes an operation unit manually operable, and said region designation unit varies said particular region depending on an operation of said operation unit.

9. The image display device of claim 3, wherein said image display device further includes an operation unit manually operable, and said region designation unit varies said particular region depending on an operation of said operation unit.

10. The image display device of claim 8, wherein said image display device further comprises:

- a position signal generation unit for generating a position signal which represents a position of said particular region in said overall image; and
- a signal mixing unit for superposing said position signal on said image signal.

11. The image display device of claim 9, wherein said image display device further comprises:

- a position signal generation unit for generating a position signal which represents a position of said particular region in said overall image; and
- a signal mixing unit for superposing said position signal on said image signal.

* * * * *

UNITED STATES PATENT AND TRADEMARK OFFICE
CERTIFICATE OF CORRECTION

PATENT NO. : 6,670,998 B2  Page 1 of 1
DATED : December 30, 2003
INVENTOR(S) : Wakabayashi, Toshitsugu It is certified that error appears in the above-identified patent and that said Letters Patent is hereby corrected as shown below:

Title page,
Item [57], ABSTRACT,
Line 7, the word "superimposed" should read -- superposed --.

Column 15,
Line 11, the word "superimposed" should read -- superposed --.
Line 13, the word "superimposed" should read -- superposed --.

Column 16,
Line 11, "superimposed" should read -- superposed --.
Line 22, "superimposed" should read -- superposedb --.

Column 18,
Lines 40-43, "superimposed and received by the image display device, and a region decision unit for deciding said particular region on a basis of said position signal; and" should read -- superposed, and a region decision unit for deciding said particular region on a basis of said position signal, said predetermined signal being received by the image display device; and --.

Signed and Sealed this

Seventeenth Day of August, 2004

JON W. DUDAS
*Acting Director of the United States Patent and Trademark Office*